United States Patent
Aiba et al.

(10) Patent No.: US 10,477,556 B2
(45) Date of Patent: Nov. 12, 2019

(54) TERMINAL DEVICE, BASE STATION DEVICE, COMMUNICATION METHOD, AND INTEGRATED CIRCUIT

(71) Applicant: Sharp Kabushiki Kaisha, Sakai, Osaka (JP)

(72) Inventors: Tatsushi Aiba, Sakai (JP); Shoichi Suzuki, Sakai (JP); Kazunari Yokomakura, Sakai (JP); Hiroki Takahashi, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 15/511,327

(22) PCT Filed: Sep. 25, 2015

(86) PCT No.: PCT/JP2015/077097
§ 371 (c)(1),
(2) Date: Mar. 15, 2017

(87) PCT Pub. No.: WO2016/047753
PCT Pub. Date: Mar. 31, 2016

(65) Prior Publication Data
US 2017/0290020 A1 Oct. 5, 2017

(30) Foreign Application Priority Data

Sep. 26, 2014 (JP) ................................ 2014-196210
Oct. 2, 2014 (JP) ................................ 2014-203823

(51) Int. Cl.
*H04W 72/04* (2009.01)
*H04J 11/00* (2006.01)
(Continued)

(52) U.S. Cl.
CPC ...... *H04W 72/0473* (2013.01); *H04B 1/3816* (2013.01); *H04J 11/00* (2013.01);
(Continued)

(58) Field of Classification Search
CPC . H04W 72/0473; H04W 52/50; H04W 8/005; H04W 88/02; H04W 92/18; H04W 84/042; H04B 1/3816
See application file for complete search history.

(56) References Cited

U.S. PATENT DOCUMENTS 7,336,638 B2 * 2/2008 Cheng ................. H04W 52/383
370/278
2006/0258383 A1 * 11/2006 Jiang ................... H04W 52/383
455/502

(Continued)

FOREIGN PATENT DOCUMENTS

WO 2014/034573 A1 3/2014
WO 2015/126567 A1 8/2015

OTHER PUBLICATIONS

3GPP TR 23.703 V12.0.0 (Feb. 2014), Mar. 10, 2014: 3rd Generation Partnership Project; Technical Specification Group Services and System Aspects; Study on architecture enhancements to support Proximity-based Services (ProSe)(Release 12).*
(Continued)

*Primary Examiner* — Babar Sarwar
(74) *Attorney, Agent, or Firm* — Keating & Bennett, LLP

(57) ABSTRACT

A terminal device configured to perform D2D transmission by a higher layer includes: a reception unit receiving from a base station device one or a plurality of first parameters relating to transmit power and receiving a second parameter for configuring a first transmission resource from the base station device; and a transmission unit performing, upon receipt of the second parameter in an RRC idle state, the D2D transmission using the first transmission resource with (Continued)

the transmit power in accordance with a first parameter corresponding to an authorized range among the one or plurality of first parameters.

18 Claims, 10 Drawing Sheets

(51) Int. Cl.
| | |
|---|---|
| H04W 52/50 | (2009.01) |
| H04W 92/18 | (2009.01) |
| H04B 1/3816 | (2015.01) |
| H04W 8/00 | (2009.01) |
| H04W 52/36 | (2009.01) |
| H04W 84/04 | (2009.01) |
| H04W 88/02 | (2009.01) |
| H04W 48/16 | (2009.01) |

(52) U.S. Cl.
CPC ......... *H04W 8/005* (2013.01); *H04W 52/367* (2013.01); *H04W 52/50* (2013.01); *H04W 92/18* (2013.01); *H04W 48/16* (2013.01); *H04W 84/042* (2013.01); *H04W 88/02* (2013.01)

(56) References Cited

U.S. PATENT DOCUMENTS

| | | | | |
|---|---|---|---|---|
| 2012/0082127 A1* | 4/2012 | Wu | .................. | H04W 8/005 370/330 |
| 2012/0213109 A1* | 8/2012 | Xu | .................. | H04B 7/024 370/252 |
| 2012/0269250 A1* | 10/2012 | Li | .................. | H04L 5/0053 375/227 |
| 2013/0259231 A1* | 10/2013 | Wang | .................. | H04W 8/005 380/270 |
| 2013/0308552 A1* | 11/2013 | Madan | .................. | H04L 5/0094 370/329 |
| 2015/0043448 A1* | 2/2015 | Chatterjee | .................. | H04W 8/005 370/329 |
| 2015/0117247 A1* | 4/2015 | Wang | .................. | H04W 24/08 370/252 |
| 2015/0173029 A1 | 6/2015 | Fujishiro | | |
| 2016/0183276 A1* | 6/2016 | Marinier | .................. | H04W 72/02 370/329 |
| 2016/0286375 A1* | 9/2016 | Fujishiro | .................. | H04W 52/383 |
| 2017/0272299 A1* | 9/2017 | Chae | .................. | H04J 11/00 |
| 2017/0290020 A1* | 10/2017 | Aiba | .................. | H04J 11/00 |
| 2017/0303291 A1* | 10/2017 | Chae | .................. | H04W 72/04 |

OTHER PUBLICATIONS

3GPP TSG CT WG1 Meeting#88, Release 12, Cape Town, South Africa, 07/14018/2014.*

Official Communication issued in International Patent Application No. PCT/JP2015/077097, dated Dec. 15, 2015.

Ericsson et al., "D2D for LTE Proximity Services: Overview", 3GPP TSG-RAN WG1 #73, R1-132028, May 20-24, 2013, pp. 1-6.

"3rd Generation Partnership Project; Technical Specification Group Services and System Aspects; Study on architecture enhancements to support Proximity-based Services (ProSe) (Release 12)", 3GPP TR 23.703 V12.0.0, Feb. 2014, pp. 1-324.

Chaponniere, "LS on ProSe direct services provisioning parameters", 3GPP TSG-CT WG1 Meeting #88, C1-143310, Jul. 14-18, 2014, 2 pages.

3rd Generation Partnership Project; Technical Specification Group Services and System Aspects; Proximity-based Services (ProSe); Stage 2 (Release 12), 3GPP TS 23.303 V12.0.0, Feb. 2014, 6 pages.

* cited by examiner

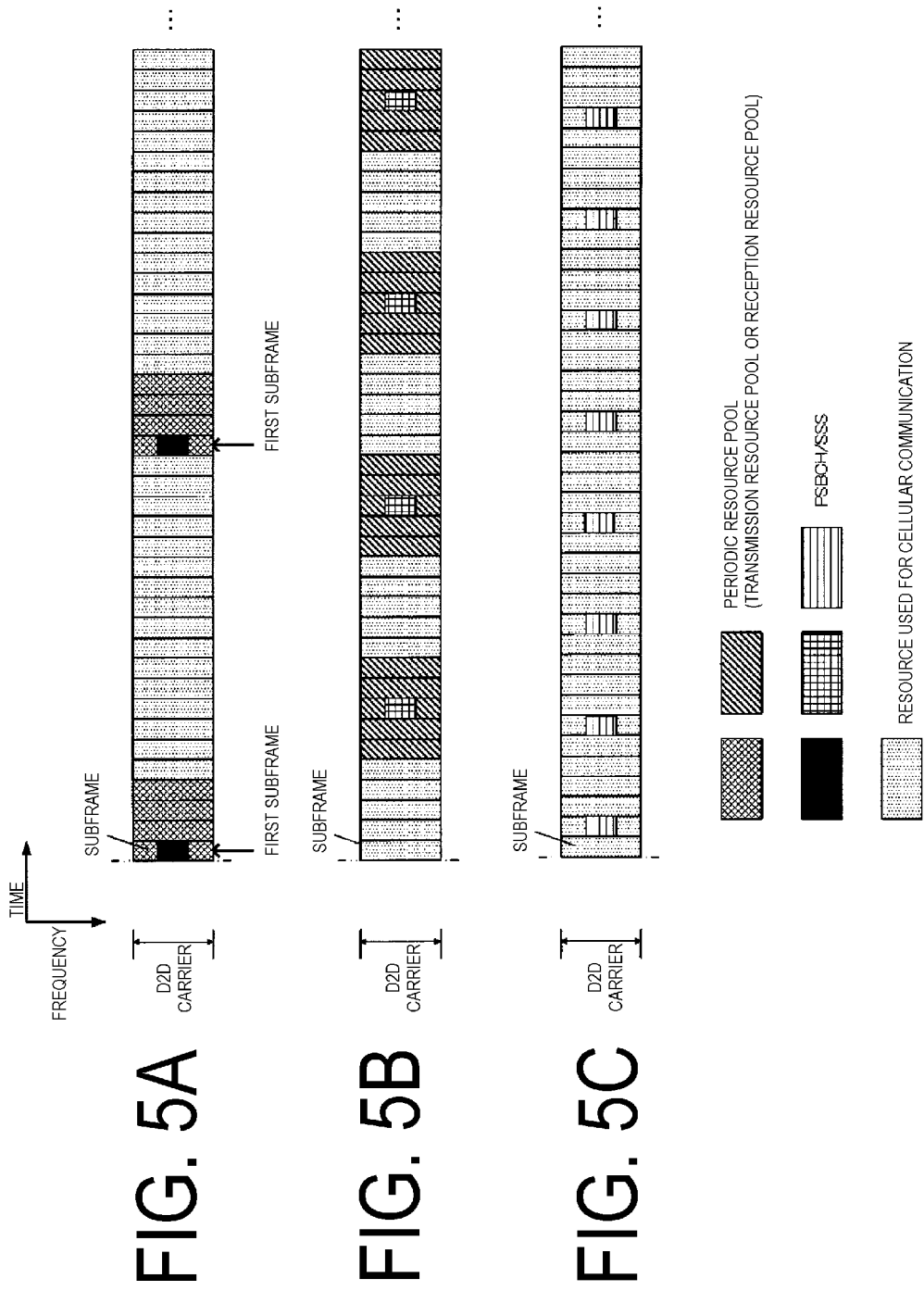

SystemInformationBlockType18 information element

Config-SIB-r12 {
Idle-P-MAX, and/or
Idle-UplinkPoweControl, and/or
Idle-TxResourcePool, and/or
RxResourcePool
}

Idle-TxResourcePool information element

Idle-TxResourcePool {
Idle-TxResourcePool-High, and/or
Idle-TxResourcePool-Medium, and/or
Idle-TxResourcePool-Low, and/or
}

Idle-P-MAX information element

Idle-P-MAX {
Idle-P-MAX-High, and/or
Idle-P-MAX-Medium, and/or
Idle-P-MAX-Low
}

Idle-UplinkPowerControl information element

Idle-UplinkPowerControl {
Idle-$P_{0\_D2D}$ {Idle-$P_{0\_D2D}$-High, and/or
Idle-$P_{0\_D2D}$-Medium, and/or
Idle-$P_{0\_D2D}$-Low} and/or
Idle-$\alpha_{D2D}$ {Idle-$\alpha_{D2D}$-High, and/or
Idle-$\alpha_{D2D}$-Medium, and/or
Idle-$\alpha_{D2D}$-Low}
}

FIG. 6

RRC dedicated message

Config-dedicated-r12 {
Connected-P-MAX, and/or
Connected-UplinkPoweControl, and/or
Connected-TxResourcePool
}

Connected-TxResourcePool information element

Connected-TxResourcePool {
Connected-TxResourcePool-High, and/or
Connected-TxResourcePool-Medium, and/or
Connected-TxResourcePool-Low, and/or
}

Connected-P-MAX information element

Connected-P-MAX {
Connected-P-MAX-High, and/or
Connected-P-MAX-Medium, and/or
Connected-P-MAX-Low
}

Connected-UplinkPowerControl information element

Connected-UplinkPowerControl {
Connected-P0_D2D {Connected--P0_D2D-High, and/or
Connected--P0_D2D-Medium, and/or
Connected--P0_D2D-Low} and/or
Connected--αD2D {Connected--αD2D-High, and/or
Connected--αD2D-Medium, and/or
Connected--αD2D-Low}
}

FIG. 7

A UE capable of D2D that is configured by higher layers to perform D2D transmission shall:
1> if either camped or in RRC_CONNECTED:
  NOTE: Only if the UE is authorized (High, Medium and/or Low), higher layers configure the UE to perform a particular D2D activity.
  2-1> if the UE is camped:
    3-1> if SystemInformationBlockType18 includes Idle-TxResourcePool:
      4-1> select resources from the pool of resources indicated by Idle-TxResourcePool,
      4-1> use the selected resources for the D2D transmission:
    3-2> else if SystemInformationBlockType18 is broadcast; and includes Config-SIB-r12:
      4-2> initiate connection establishment;
  2-2> if the UE is in RRC_Connected:
    3-3> if the UE is configured with Connected-TxResourcePool:
      4-3> use the assigned resources indicated by Connected-TxResourcePool in Config-Dedicated-r12 for the D2D transmission:
    3-4> else (i.e. the UE is not configured with Connected-TxResourcePool):
      4-4> request E-UTRAN to assign the resources for the D2D transmission (by the assistance information)

FIG. 8

TERMINAL DEVICE, BASE STATION DEVICE, COMMUNICATION METHOD, AND INTEGRATED CIRCUIT

This application claims priority based on Japanese Patent Application No. 2014-196210 filed in Japan on Sep. 26, 2014 and Japanese Patent Application No. 2014-203823 filed in Japan on Oct. 2, 2014, the contents of which are incorporated herein by reference.

TECHNICAL FIELD

The present invention relates to a terminal device, a base station device, an integrated circuit, and a communication method.

BACKGROUND ART

In the 3rd Generation Partnership Project (3GPP), a radio access method (Evolved Universal Terrestrial Radio Access (EUTRA)) and a radio access network (Evolved Universal Terrestrial Radio Access Network (EUTRAN)) for cellular mobile communications have been considered. EUTRA and EUTRAN are also referred to as Long Term Evolution (LTE). In LTE, a base station device is also referred to as an evolved NodeB (eNodeB), and a terminal device is also referred to as user equipment (UE). LTE is a cellular communication system in which an area is divided into a plurality of cells to form a cellular pattern, each of the cells being served by a base station device. A single base station device may manage a plurality of cells.

In 3GPP, proximity based services (ProSe) has been considered. ProSe includes ProSe discovery and ProSe communication. ProSe discovery is a process that identifies, using EUTRA, a terminal device and a different terminal devices being in proximity to each other. ProSe communication is communication between two terminal devices that are in proximity to each other, using an EUTRAN communication path established between the two terminal devices. For example, the communication path may be established directly between the terminal devices.

ProSe discovery and ProSe communication are also referred to as device to device (D2D) discovery and D2D communication, respectively. ProSe discovery and ProSe communication are also collectively referred to as ProSe. D2D discovery (device discovery) and D2D communication (device communication) are also collectively referred to as D2D. In other words, ProSe may be D2D. D2D includes transmission and/or reception associated with D2D. D2D includes transmission and/or reception associated with D2D discovery. D2D includes transmission and/or reception associated with D2D communication. Here, a communication path is also referred to as a link.

NPL 1 describes that a subset of resource blocks is reserved for D2D, a network configures a set of D2D resources, and terminal devices are allowed to transmit D2D signals with the configured resources.

CITATION LIST

Non Patent Literature

NPL 1: "D2D for LTE Proximity Services: Overview", R1-132028, 3GPP TSG-RAN WG1 Meeting #73, 20 to 24 May 2013.

SUMMARY OF INVENTION

Technical Problem

However, processes to be performed when terminal devices perform D2D communication have not been considered sufficiently. The present invention is a terminal device capable of efficiently performing D2D, a base station device configured to control the terminal device, an integrated circuit mounted on the terminal device, a base station device used by the base station device, a communication method used by the terminal device, and a communication method used by the base station device.

Solution to Problem (1) A terminal device according to a first embodiment of the present invention is a terminal device communicating with a network. The terminal device includes: a reception unit receiving a system information block from the network; and a transmission unit transmitting a physical sidelink discovery channel associated with discovery using a link between the terminal device and a different terminal device. The discovery is defined as a process that identifies the terminal device and the different terminal device being in proximity to each other. Transmit power for the transmission of the physical sidelink discovery channel is given with reference to at least a maximum output power. The maximum output power is given with reference to one parameter of a plurality of parameters included in the system information block. An authorized range is used to determine the one parameter.

(2) In the terminal device according to the first embodiment of the present invention, the authorized range is defined for each public land mobile network (PLMN).

(3) In the terminal device according to the first embodiment of the present invention, the authorized range is preconfigured in the terminal device.

(4) In the terminal device according to the first embodiment of the present invention, a subscriber identity module (SIM) or a storage medium in which the authorized range is stored is referred to.

(5) In the terminal device according to the first embodiment of the present invention, the authorized range stored in the subscriber identity module (SIM) or the storage medium is given a higher priority than a priority given to the authorized range preconfigured in the terminal device.

(6) In the terminal device according to the first embodiment of the present invention, information on the authorized range is transferred to the terminal device by a proximity based services (Prose) function.

(7) The terminal device according to the first embodiment of the present invention is in-coverage of the network.

(8) A network according to a second embodiment of the present invention is a network communicating with a terminal device. The network includes a transmission unit transmitting a system information block to the terminal device. The terminal device transmits a physical sidelink discovery channel associated with discovery using a link between the terminal device and a different terminal device. The discovery is defined as a process that identifies the terminal device and the different terminal device being in proximity to each other. Transmit power for the transmission of the physical sidelink discovery channel is given with reference to at least a maximum output power. The maximum output power is given with reference to one parameter of a plurality of parameters included in the system information block. An authorized range is used to determine the one parameter.

(9) A communication method according to a third embodiment of the present invention is a communication method of a terminal device communicating with a network. The communication method includes the steps of: receiving a system information block from the network; and transmitting a physical sidelink discovery channel associated with discovery using a link between the terminal device and a different terminal device. The discovery is defined as a process that identifies the terminal device and the different terminal device being in proximity to each other. Transmit power for the transmission of the physical sidelink discovery channel is given with reference to at least a maximum output power. The maximum output power is given with reference to one parameter of a plurality of parameters included in the system information block. An authorized range is used to determine the one parameter.

(10) In the communication method according to the third embodiment of the present invention, the authorized range is defined for each public land mobile network (PLMN).

(11) In the communication method according to the third embodiment of the present invention, the authorized range is preconfigured in the terminal device.

(12) In the communication method according to the third embodiment of the present invention, a subscriber identity module (SIM) or a storage medium in which the authorized range is stored is referred to.

(13) In the communication method according to the third embodiment of the present invention, the authorized range stored in the subscriber identity module (SIM) or the storage medium is given a higher priority than a priority given to the authorized range preconfigured in the terminal device.

(14) In the communication method according to the third embodiment of the present invention, information on the authorized range is transferred to the terminal device by a proximity based services (Prose) function.

(15) In the communication method according to the third embodiment of the present invention, the terminal device is in-coverage of the network.

(16) A communication method according to a fourth embodiment of the present invention is a communication method of a network communicating with a terminal device. The communication method includes the step of transmitting a system information block to the terminal device. The terminal device transmits a physical sidelink discovery channel associated with discovery using a link between the terminal device and a different terminal device. The discovery is defined as a process that identifies the terminal device and the different terminal device being in proximity to each other. Transmit power for the transmission of the physical sidelink discovery channel is given with reference to at least a maximum output power. The maximum output power is given with reference to one parameter of a plurality of parameters included in the system information block. An authorized range is used to determine the one parameter.

(17) An integrated circuit according to a fifth embodiment of the present invention is an integrated circuit mounted on a terminal device communicating with a network. The integrated circuit causes the terminal device to exert: a function of receiving a system information block from the network; and a function of transmitting a physical sidelink discovery channel associated with discovery using a link between the terminal device and a different terminal device. The discovery is defined as a process that identifies the terminal device and the different terminal device being in proximity to each other. Transmit power for the transmission of the physical sidelink discovery channel is given with reference to at least a maximum output power. The maximum output power is given with reference to one parameter of a plurality of parameters included in the system information block. An authorized range is used to determine the one parameter.

(18) An integrated circuit according to a sixth embodiment of the present invention is an integrated circuit mounted on a network communicating with a terminal device. The integrated circuit causes the network to exert a function of transmitting a system information block to the terminal device. The terminal device transmits a physical sidelink discovery channel associated with discovery using a link between the terminal device and a different terminal device. The discovery is defined as a process that identifies the terminal device and the different terminal device being in proximity to each other. Transmit power for the transmission of the physical sidelink discovery channel is given with reference to at least a maximum output power. The maximum output power is given with reference to one parameter of a plurality of parameters included in the system information block. An authorized range is used to determine the one parameter.

Advantageous Effects of Invention

According to the present invention, D2D can be performed efficiently.

BRIEF DESCRIPTION OF DRAWINGS

FIGS. 5A to 5C are diagrams illustrating examples of a method of transmitting D2DSS/PD2DSCH.

FIG. 6 is a diagram illustrating an example of a System-InformationBlockType18 information element.

FIG. 7 is a diagram illustrating an example of a dedicated message information element.

FIG. 8 is a diagram illustrating an example of operations in a terminal device 1.

DESCRIPTION OF EMBODIMENT

An embodiment of the present invention will be described below.

According to the present embodiment, one or a plurality of cells are configured for a terminal device. A technology in which a terminal device performs communication using the plurality of cells is referred to as cell aggregation or carrier aggregation. The present invention may be applied to each of the plurality of cells configured for the terminal device. Furthermore, the present invention may be applied to some of the configured plurality of cells. A cell configured for the terminal device is referred to as a serving cell. The serving cell is used for EUTRAN communication. A cell configured for D2D may be referred to as a D2D cell. The D2D cell may be a serving cell. Alternatively, the D2D cell may be a cell other than a serving cell.

Here, the configured plurality of serving cells include one primary cell and one or a plurality of secondary cells. For example, the primary cell is a serving cell in which an initial connection establishment procedure has been performed, a serving cell in which a connection re-establishment procedure has been started, or a cell indicated as a primary cell during a handover procedure. The secondary cell may be configured at the time when radio resource control (RRC) connection is established (RRC-connected) or after RRC connection is established.

Furthermore, for cell aggregation, a time division duplex (TDD) scheme or a frequency division duplex (FDD) scheme may be applied to all the plurality of cells. Cells to which the TDD scheme is applied and cells to which the FDD scheme is applied may be aggregated.

Figure 1:
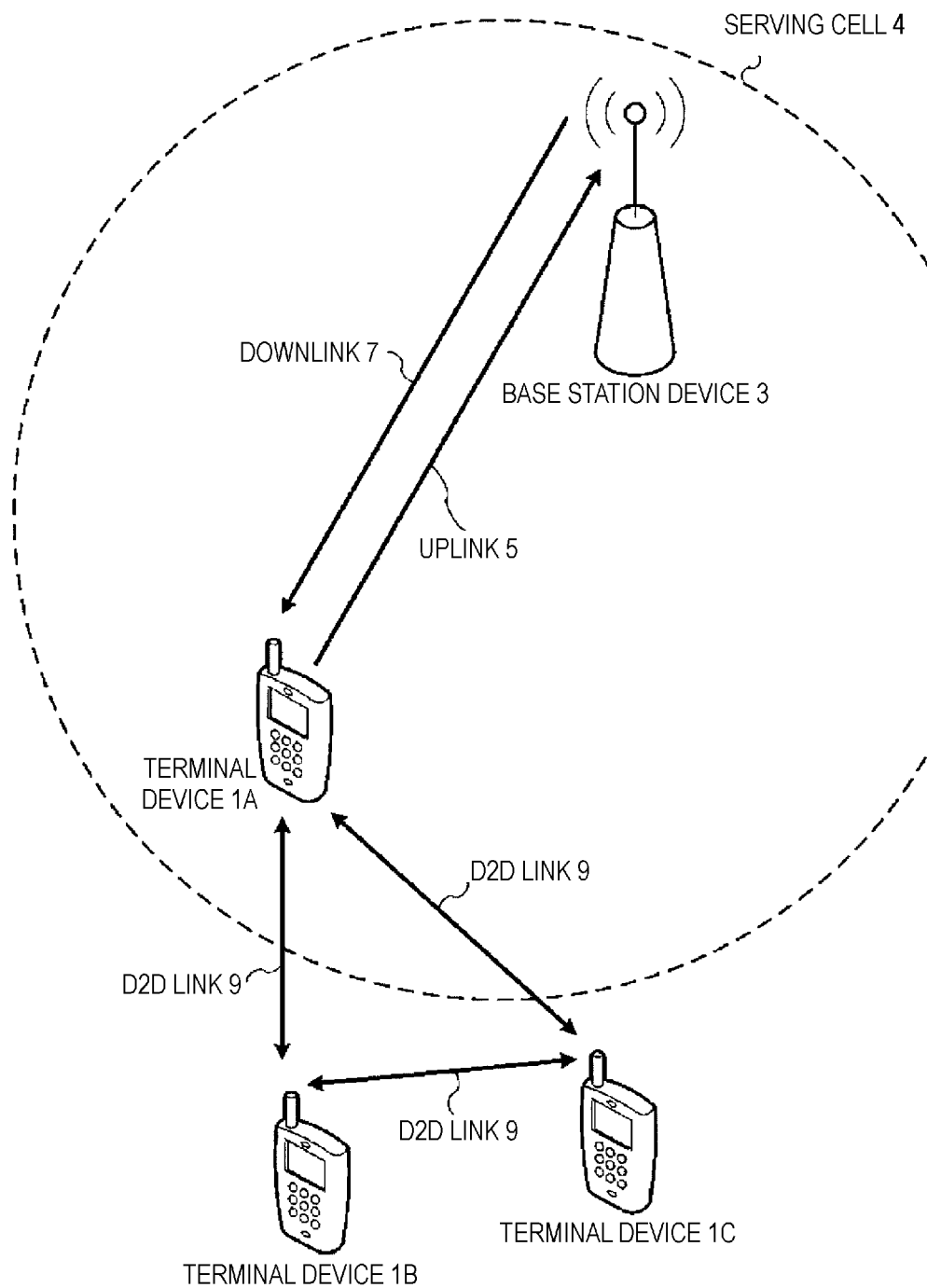
FIG. 1 is a conceptual diagram of a radio communication system.

FIG. 1 is a conceptual diagram of a radio communication system according to the present embodiment. In FIG. 1, the radio communication system includes terminal devices 1A to 1C and a base station device 3. Here, the terminal devices 1A to 1C are each referred to as a terminal 1. A serving cell 4 indicates an area covered by (coverage of) the base station device 3 (LTE or EUTRAN). Here, the terminal device 1A is located in-coverage of EUTRAN. The terminal device 1B and the terminal device 1C are located out-of-coverage of EUTRAN.

An uplink 5 is a link from the terminal device 1 to the base station device 3. Note that, in the uplink 5, a signal may be transmitted directly from the terminal device 1 to the base station device 3 without using any repeater. A downlink 7 is a link from the base station device 3 to the terminal device 1. The uplink 5 and the downlink 7 may be referred to as a cellular link or a cellular communication path. Communication between the terminal device 1 and the base station device 3 may be referred to as cellular communication or communication with EUTRAN.

D2D links 9 are links between the terminal devices 1. Note that each D2D link 9 may be referred to as a D2D communication path, a ProSe link, or a ProSe communication path. The D2D link 9 may be referred to as a sidelink. In the D2D link 9, D2D discovery and D2D communication are performed. For example, D2D discovery is a process/procedure that identifies, using EUTRA, the terminal device 1 and another terminal device 1 being in proximity to each other. D2D communication is communication between the plurality of terminal devices 1 that are in proximity to each other, the communication being performed through the EUTRAN communication path established between the plurality of terminal devices 1. Here, for example, the communication path may be established directly between the terminal devices 1.

Physical channels and physical signals according to the present embodiment will be described.

Downlink physical channels and downlink physical signals may collectively be referred to as a downlink signal. Uplink physical channels and uplink physical signals may collectively be referred to as an uplink signal. D2D physical channels and D2D physical signals may collectively be referred to as a D2D signal. Here, each physical channel is used to transmit information output from a higher layer. Each physical signal is not used to transmit the information output from the higher layer but is used by a physical layer.

In FIG. 1, the following D2D physical channels are used in the radio communication through the D2D links 9 between the terminal devices 1.

Physical sidelink broadcast channel (PSBCH)
Physical sidelink control channel (PSCCH)
Physical sidelink shared channel (PSSCH)
Physical sidelink discovery channel (PSDCH)

The PSBCH may be used to transmit information related to synchronization and information indicating a set of D2D resources (also referred to as a resource pool or a pool). For example, information related to synchronization and information indicating a set of D2D resources are transmitted on a sidelink broadcast channel (SL-BCH). The SL-BCH is a transport channel. In other words, the SL-BCH is mapped to the PSBCH.

The PSCCH may be used to transmit sidelink control information (SCI). In other words, the SCI may be mapped to the PSCCH. Here, a plurality of SCI formats may be defined as formats for transmitting the SCI. For example, SCI format 0 and SCI format 1 may be defined. For example, SCI format 0 may be used for the scheduling of PSSCH.

For example, SCI such as information indicating resource allocation for PSSCH or information indicating a modulation and coding scheme may be transmitted using SCI format 0. SCI such as information indicating timing advance indication and information indicating group destination identity may be transmitted in SCI format 0.

The PSSCH may be used for transmission of D2D communication. Specifically, the PSSCH may be used to transmit D2D data corresponding to D2D communication. For example, D2D data corresponding to D2D communication is transmitted on an SL-SCH. The SL-SCH is a transport channel. In other words, the SL-SCH is mapped to the PSSCH.

The PSDCH may be used for transmission of D2D discovery. Specifically, the PSDCH may be used to transmit D2D data corresponding to D2D discovery. For example, D2D data corresponding to D2D discovery is transmitted on an SL-DCH. The SL-DCH is a transport channel. In other words, the SL-DCH is mapped to the PSDCH.

Here, D2D data (SL-DCH/PSDCH) corresponding to D2D discovery and/or the PSCCH corresponding to D2D discovery may be referred to as a discovery signal. D2D data (SL-SCH/PSSCH) corresponding to D2D communication and/or the PSCCH corresponding to D2D communication may be referred to as a communication signal.

In FIG. 1, the following D2D physical signals are used for D2D radio communication.

Sidelink synchronization signal (SSS)
Sidelink demodulation reference signal (SDRS)

The SSS may be used to synchronize D2D links. The SSS may include a primary sidelink synchronization signal (PSSS) and a secondary sidelink synchronization signal (SSSS). The SSS is mapped to the same resource block as the resource block to which the PSBCH, the PSCCH, and/or the PSSCH is mapped. The SSS may relate to transmission of the PSBCH, the PSCCH, and/or the PSSCH. The SSS may be time-multiplexed with the PSBCH, the PSCCH, and/or the PSSCH. The terminal device 1 may use the SSS to perform channel compensation of the PSBCH, the PSCCH, and/or the PSSCH.

Here, the SSS may be periodically transmitted in a period configured by the base station device or a preconfigured period. The SSS may be transmitted in a resource configured by the base station device (e.g., the first subframe (or part of the first subframe) in a resource pool configured by the base station device, or the like) or a preconfigured resource (e.g., the first subframe (or part of the first subframe) in a preconfigured resource pool, or the like).

The terminal device 1 may transmit the SSS when the terminal device 1 serves as a synchronization source. In other words, the terminal device 1 can serve as a synchronization source. Here, the terminal device 1 may serve as a synchronization source when being instructed by the base station device 3. Alternatively, the terminal device 1 may serve as a synchronization source when determining that no synchronization source exists around the terminal device 1.

The SDMRS may relate to transmission of the PSBCH, the PSCCH, the PSDCH, and/or the PSSCH. The terminal device 1 may use the SDMRS to perform channel compensation of the PSBCH, the PSCCH, the PSDCH, and/or the PSSCH.

Here, from the viewpoint of the terminal device 1 that performs transmission, the terminal device 1 may operate in two modes (mode 1 and mode 2) of resource allocation for D2D communication.

In mode 1, EUTRAN (base station device 3) may schedule precise resources for transmission of information to be used by the terminal device 1. In other words, in mode 1, resources for transmission of information for the terminal device 1 may be scheduled by EUTRAN (base station device 3).

In mode 2, the terminal device 1 may select resources from a resource pool for transmission of information. In other words, in mode 2, resources for transmission of information may be selected by the terminal device 1. Here, the resource pool may be a set of resources. The resource pool for mode 2 may be configured/restricted in a semi-static manner by EUTRAN (base station device 3). The resource pool for mode 2 may be preconfigured.

The terminal device 1 that is capable of D2D communication and is in-coverage of EUTRAN may support mode 1 and mode 2. The terminal device 1 that is capable of D2D communication and is out-of-coverage of EUTRAN may support mode 2 only. The base station device 3 may instruct the terminal device 1 whether to operate in mode 1 or operate in mode 2. The base station device 3 may include information (parameter) for instructing the terminal device 1 whether to operate in mode 1 or operate in mode 2 in a higher layer signal and transmit the signal.

The terminal device 1 that is capable of D2D communication and is in a radio resource control (RRC) connected state may support mode 1 and mode 2. The terminal device 1 that is capable of D2D communication and is in an RRC idle state may support mode 2 only.

Two types (type 1 and type 2) may be defined as D2D discovery procedures.

The D2D discovery procedure of type 1 may be a D2D discovery procedure in which resources for discovery signals are not allocated individually to the terminal devices 1. In other words, in the D2D discovery procedure of type 1, resources for discovery signals may be allocated to all the terminal devices 1 or a group of the terminal devices 1.

The D2D discovery procedure of type 2 may be a D2D discovery procedure in which resources for discovery signals are allocated individually to the terminal devices 1. The discovery procedure of type 2 in which resources are allocated individually for transmission instances of the discovery signals is referred to as a type 2A discovery procedure. The discovery procedure of type 2 in which resources are semi-persistently allocated for transmission of the discovery signals is referred to as a type 2B discovery procedure.

The terminal device 1 that is capable of D2D discovery and is in a radio resource control (RRC) connected state may support type 1 only. The terminal device 1 that is capable of D2D discovery and is in an RRC idle state may support type 2 only.

In FIG. 1, the following uplink physical channels are used for the uplink radio communication.

Physical uplink control channel (PUCCH)
Physical uplink shared channel (PUSCH)
Physical random access channel (PRACH)

The PUCCH may be used to transmit uplink control information (UCI).

The PUSCH may be used to transmit uplink data (uplink-shared channel (UL-SCH)), an HARQ-ACK, and/or channel state information.

The PUSCH may be used to transmit an RRC message. The RRC message is information/signal that is processed in a radio resource control (RRC) layer. The PUSCH may be used to transmit a MAC control element (CE). Here, the MAC CE is information/signal that is processed (transmitted) in a medium access control (MAC) layer.

The PRACH may be used to transmit a random access preamble. The PRACH may be used in an initial connection establishment procedure, a handover procedure, and a connection re-establishment procedure.

In FIG. 1, the following uplink physical signal is used for the uplink radio communication.

Uplink reference signal (UL RS)

According to the present embodiment, the following two types of uplink reference signals are used.

Demodulation reference signal (DMRS)
Sounding reference signal (SRS)

The DMRS may relate to the transmission of the PUSCH or the PUCCH. The DMRS may be time-multiplexed with the PUSCH or the PUCCH. The base station device 3 may use the DMRS to perform channel compensation of the PUSCH or the PUCCH. The SRS does not need to relate to the transmission of the PUSCH or the PUCCH. The base station device 3 may use the SRS to measure an uplink channel state.

In FIG. 1, in the downlink radio communication, the following downlink physical channels are used.

Physical broadcast channel (PBCH)
Physical control format indicator channel (PCFICH)
Physical hybrid automatic repeat request indicator channel (PHICH)
Physical downlink control channel (PDCCH)
Enhanced physical downlink control channel (EPDCCH)
Physical downlink shared channel (PDSCH)
Physical multicast channel (PMCH)

The PBCH may be used to broadcast a master information block (MIB, a broadcast channel (BCH)) that is shared by the terminal devices 1. For example, the MIB may include information indicating an SFN. The system frame number (SFN) is a radio frame number. The MIB is system information.

The PCFICH may be used to transmit information indicating a region (OFDM symbols) to be used for transmission of the PDCCH.

The PHICH may be used to transmit an HARQ indicator indicating an acknowledgment (ACK) or a negative acknowledgment (NACK) with respect to the uplink data (uplink shared channel (UL-SCH)) received by the base station device 3.

The PDCCH and the EPDCCH may be used to transmit downlink control information (DCI). Here, a DCI format may be defined for the transmission of downlink control information. The downlink control information includes a downlink grant, an uplink grant, and a D2D grant. The downlink grant is also referred to as downlink assignment or downlink allocation.

The uplink grant may be used for scheduling of a single PUSCH within a single cell. The uplink grant may be used for scheduling of a single PUSCH within a certain subframe. The downlink grant may be used for scheduling of a single PDSCH within a single cell. The downlink grant may be used for scheduling of the PDSCH within the same subframe as the subframe in which the downlink grant has been transmitted.

The D2D grant is used for scheduling of the PSCCH, the PSSCH, and/or the PSDCH associated with mode 1 of D2D communication. Specifically, the D2D grant may be used for scheduling of the PSCCH, the PSSCH, and/or the PSDCH for the terminal device 1 operating in mode 1.

Cyclic redundancy check (CRC) parity bits are attached to the DCI (or DCI format). The CRC parity bits are scrambled with a cell-radio network temporary identifier (C-RNTI), a semi persistent scheduling cell-radio network temporary identifier (SPS C-RNTI), or a sidelink-radio network temporary identifier (S-RNTI).

For example, CRC parity bits scrambled with the S-RNTI are attached to the DCI (or the D2D grant). Alternatively, CRC parity bits scrambled with the C-RNTI are attached to the DCI. Alternatively, CRC parity bits scrambled with the SPS C-RNTI are attached to the DCI. The C-RNTI, the SPS C-RNTI, and the S-RNTI are identifiers for identifying the terminal device 1 within a cell.

Here, the C-RNTI is used to control a PDSCH resource or a PUSCH resource in a single subframe. The SPS C-RNTI is used to periodically allocate a resource for the PDSCH or the PUSCH. The S-RNTI is used to transmit the D2D grant. Specifically, the S-RNTI is used for scheduling of the PSCCH and/or the PSSCH in mode 1.

The PDSCH is used to transmit downlink data (downlink shared channel (DL-SCH)).

The PDSCH may be used to transmit a system information message. For example, the system information message may include a message of a system information block type associated with D2D.

The message of the system information block type associated with D2D is also referred to as SystemInformationBlockType18 below. Although the message of the system information block type of D2D is also referred to as SystemInformationBlockType18, it is needless to say that SystemInformationBlockType18 may be SystemInformationBlockTypeX other than SystemInformationBlockType18.

Here, the system information message is cell-specific information. The system information message is also an RRC message.

The PDSCH may be used to transmit an RRC message. Here, the RRC message transmitted from the base station device 3 may be common to the plurality of terminal devices 1 within a cell. For example, the RRC message transmitted from the base station device 3 may be used to identify a radio resource configuration common to the plurality of terminal devices 1. In other words, cell-specific information may be transmitted using the RRC message.

The RRC message to be transmitted from the base station device 3 may be a dedicated message (also referred to as dedicated signaling) for a certain one of the terminal devices 1. For example, the RRC message to be transmitted from the base station device 3 may be used to identify a dedicated radio resource configuration for the certain terminal device 1. In other words, user-device-specific information may be transmitted using the RRC message. The PDSCH may be used to transmit the MAC CE.

Here, the RRC message and/or the MAC CE may also be referred to as a higher layer signal.

The PMCH may be used to transmit multicast data (multicast channel (MCH)).

In FIG. 1, in the downlink radio communication, the following downlink physical signals are used.

Synchronization signal (SS)
Downlink reference signal (DL RS)

The synchronization signal may be used in order for the terminal device 1 to be synchronized in terms of frequency and time domains for downlink. For example in the FDD scheme, the synchronization signal is mapped to subframes 0 and 5 within the radio frame.

The downlink reference signal may be used in order for the terminal device 1 to perform the channel compensation of the downlink physical channel. For example, the downlink reference signal is used in order for the terminal device 1 to calculate the downlink channel state information. The downlink reference signal may be used in order for the terminal device 1 to measure a geographical location of the terminal device 1 itself.

According to the present embodiment, the following five types of downlink reference signals are used.

Cell-specific reference signal (CRS)
UE-specific reference signal (URS) associated with the PDSCH
Demodulation reference signal (DMRS) associated with the EPDCCH
Non-zero power channel state information-reference signal (NZP CSI-RS)
Zero power channel state information-reference signal (ZP CSI-RS)
Multimedia broadcast and multicast service over single frequency network reference signal (MBSFN RS)

The CRS is transmitted in the entire band of a subframe. The CRS may be used to perform demodulation of the PBCH/PDCCH/PHICH/PCFICH/PDSCH. The CRS may be used in order for the terminal device 1 to calculate the downlink channel state information. The PBCH/PDCCH/PHICH/PCFICH may be transmitted on an antenna port used for transmission of the CRS.

The URS associated with the PDSCH may be transmitted in a subframe and in a band that are used for transmission of the PDSCH to which the URS relates. The URS may be used to demodulate the PDSCH with which the URS is associated. The PDSCH may be transmitted on an antenna port used for transmission of the CRS or an antenna port used for transmission of the URS.

The DMRS associated with the EPDCCH may be transmitted in a subframe and in a band that are used for transmission of the EPDCCH to which the DMRS relates. The DMRS may be used to demodulate the EPDCCH with which the DMRS is associated. The EPDCCH may be transmitted on an antenna port used for transmission of the DMRS.

The NZP CSI-RS is transmitted in a subframe that is configured. A resource in which the NZP CSI-RS is transmitted may be configured by the base station device 3. The NZP CSI-RS may be used in order for the terminal device 1 to calculate the downlink channel state information. Here, the terminal device 1 performs signal measurement (channel measurement) using the NZP CSI-RS.

A resource for the ZP CSI-RS is configured by the base station device 3. With zero output, the base station device 3 may transmit the ZP CSI-RS. In other words, the base station device 3 does not transmit the ZP CSI-RS. The base station device 3 transmits neither the PDSCH nor the EPDCCH in a resource configured for the ZP CSI-RS. In other words, for example, in a certain cell, the terminal device 1 can measure interference in a resource to which the NZP CSI-RS corresponds.

The MBSFN RS is transmitted in the entire band of a subframe used for transmission of the PMCH. The MBSFN RS may be used to demodulate the PMCH. The PMCH may be transmitted on an antenna port used for transmission of the MBSFN RS.

The SL-DCH, the SL-SCH, the SL-BCH, the BCH, the MCH, the UL-SCH, and the DL-SCH are transport channels. A channel used in a medium access control (MAC) layer is referred to as a transport channel. The unit of data on the transport channel used in the MAC layer is also referred to as a transport block (TB) or a MAC protocol data unit (PDU). Control of a hybrid automatic repeat request (HARQ) is performed for each transport block in the MAC layer. The transport block is a unit of data that the MAC layer delivers to the physical layer. In the physical layer, the transport block is mapped to a codeword, and coding processing is performed on a codeword-by-codeword basis.

A structure of the radio frame according to the present embodiment will be described.

LTE supports two types of radio frame structures. The two types of radio frame structures include frame structure type 1 and frame structure type 2. Frame structure type 1 is applicable to FDD. Frame structure type 2 is applicable to TDD.

Figure 2:
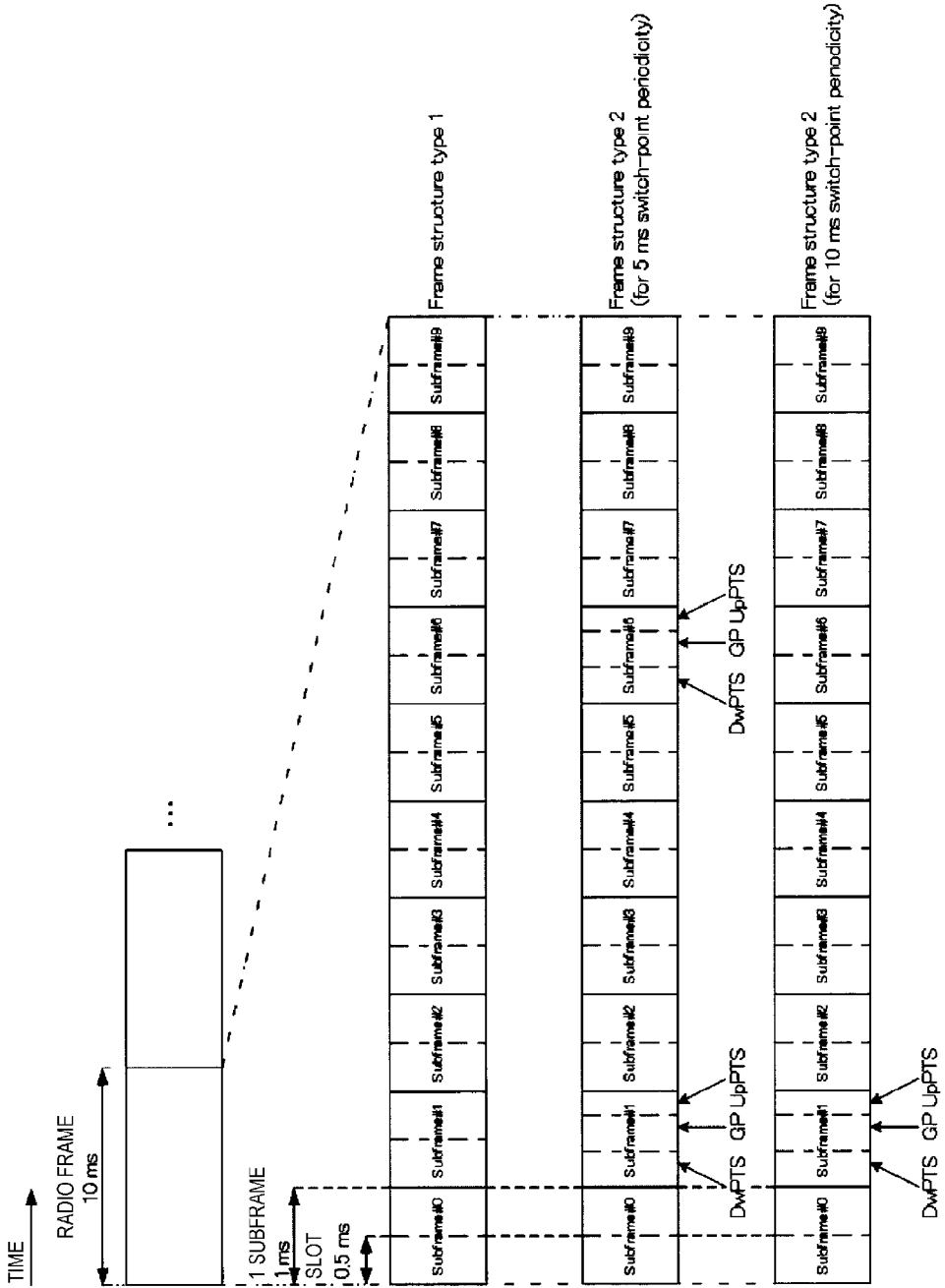
FIG. 2 is a diagram illustrating a schematic configuration of a radio frame.

FIG. 2 is a diagram illustrating a schematic configuration of a radio frame according to the present embodiment. In FIG. 2, the horizontal axis is a time axis. Each of the radio frames of type 1 and type 2 is 10 ms in length and is defined by 10 subframes. Each of the subframes is 1 ms in length and is defined by two consecutive slots. Each of the slots is 0.5 ms in length. The i-th subframe within a radio frame is constituted of the (2×i)-th slot and the (2×i+1)-th slot.

For frame structure type 2, the following three types of subframes are defined.

Downlink subframe
Uplink subframe
Special subframe

The downlink subframe is a subframe reserved for downlink transmission. The uplink subframe is a subframe reserved for uplink transmission. The special subframe is constituted of three fields. The three fields are a downlink pilot time slot (DwPTS), a guard period (GP), and an uplink pilot time slot (UpPTS). The sum of lengths of the DwPTS, the GP, and the UpPTS is 1 ms.

The DwPTS is a field reserved for the downlink transmission. The UpPTS is a field reserved for the uplink transmission. The GP is a field in which neither the downlink transmission nor the uplink transmission is performed. Here, the special subframe may be constituted only of the DwPTS and the GP, or may be constituted only of the GP and the UpPTS.

A radio frame of frame structure type 2 is constituted of at least the downlink subframe, the uplink subframe, and the special subframe.

A subframe for D2D may be referred to as a sidelink subframe. In FDD, the sidelink subframe may be a subframe of an uplink component carrier. In TDD, the sidelink subframe may be an uplink subframe.

A configuration of a slot according to the present embodiment will be described.

Figure 3:
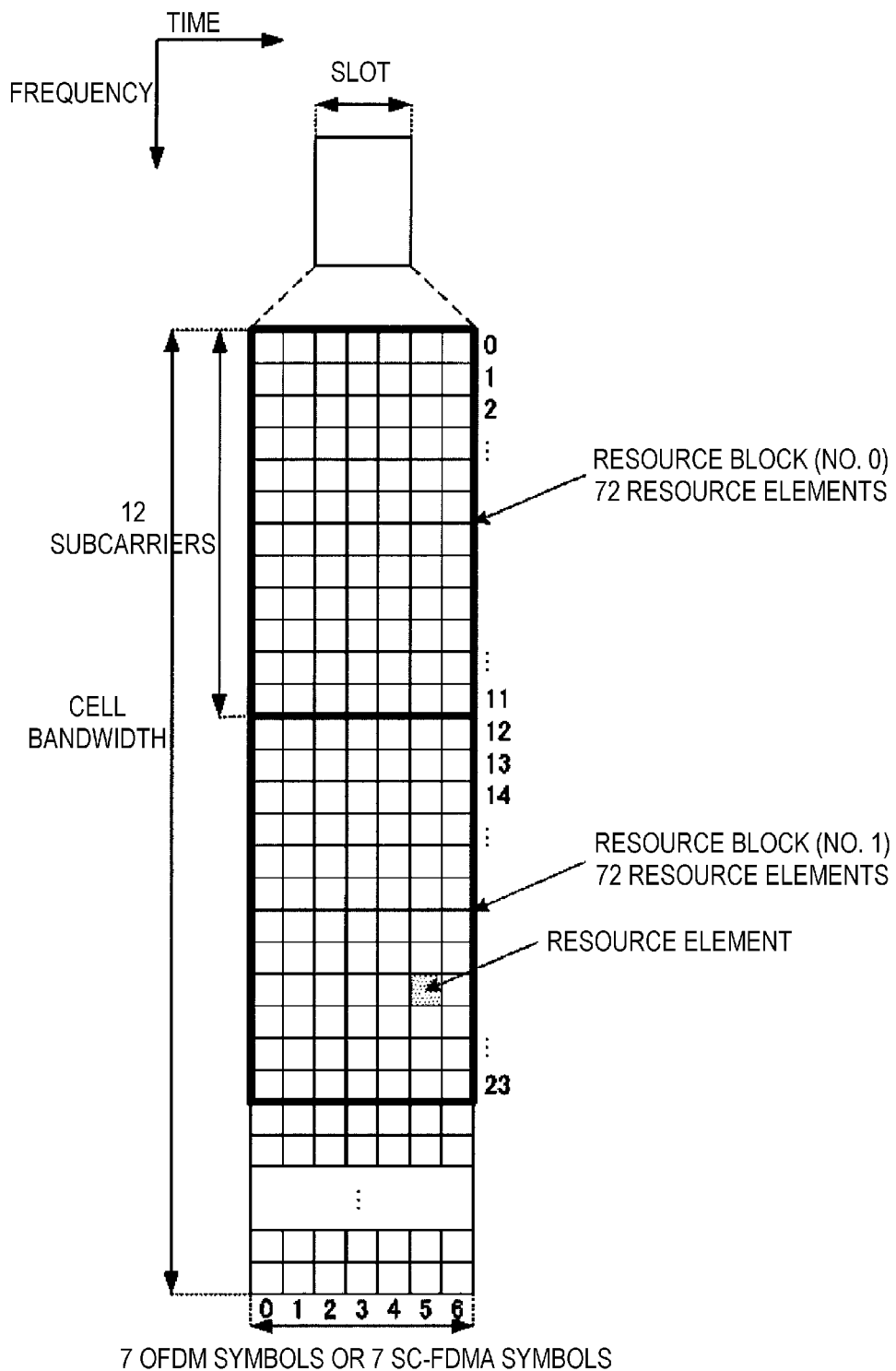
FIG. 3 is a diagram illustrating a configuration of a slot.

FIG. 3 is a diagram illustrating a configuration of a slot according to the present embodiment. In FIG. 3, a normal cyclic prefix (CP) may be applied to the OFDM symbol or the SC-FDMA symbol. The physical signal or the physical channel to be transmitted in each of the slots is expressed by a resource grid.

In FIG. 3, the horizontal axis is a time axis, and the vertical axis is a frequency axis. In downlink, the resource grid is defined by a plurality of subcarriers and a plurality of OFDM symbols. In uplink, the resource grid is defined by a plurality of subcarriers and a plurality of SC-FDMA symbols.

For example, in D2D link, the resource grid may be defined by a plurality of subcarriers and a plurality of SC-FDMA symbols. The number of subcarriers constituting one slot depends on a cell bandwidth. For example, the number of OFDM symbols or SC-FDMA symbols constituting one slot is seven. Each of the elements within the resource grid is referred to as a resource element. For example, the resource element is identified using a subcarrier number and an OFDM symbol or SC-FDMA symbol number.

A resource block is used to express mapping of a certain physical channel (the PDSCH, the PUSCH, or the like) to resource elements. The resource block is defined by a virtual resource block and a physical resource block. Specifically, a certain physical channel is first mapped to the virtual resource block. Thereafter, the virtual resource block is mapped to the physical resource block.

Here, one physical resource block is defined by seven consecutive OFDM symbols or SC-FDMA symbols in a time domain and by 12 consecutive subcarriers in a frequency domain. Therefore, one physical resource block is constituted of (7×12) resource elements. Furthermore, one physical resource block corresponds to one slot in the time domain and corresponds to 180 kHz in the frequency domain. For example, the physical resource blocks are numbered from 0 in the frequency domain.

Here, an extended CP may be applied to the OFDM symbol or the SC-FDMA symbol. For example, when the extended CP is applied, the number of OFDM symbols or SC-FDMA symbols constituting one slot is seven.

Mapping of a physical channel and a physical signal according to the present embodiment will be described.

Figure 4:
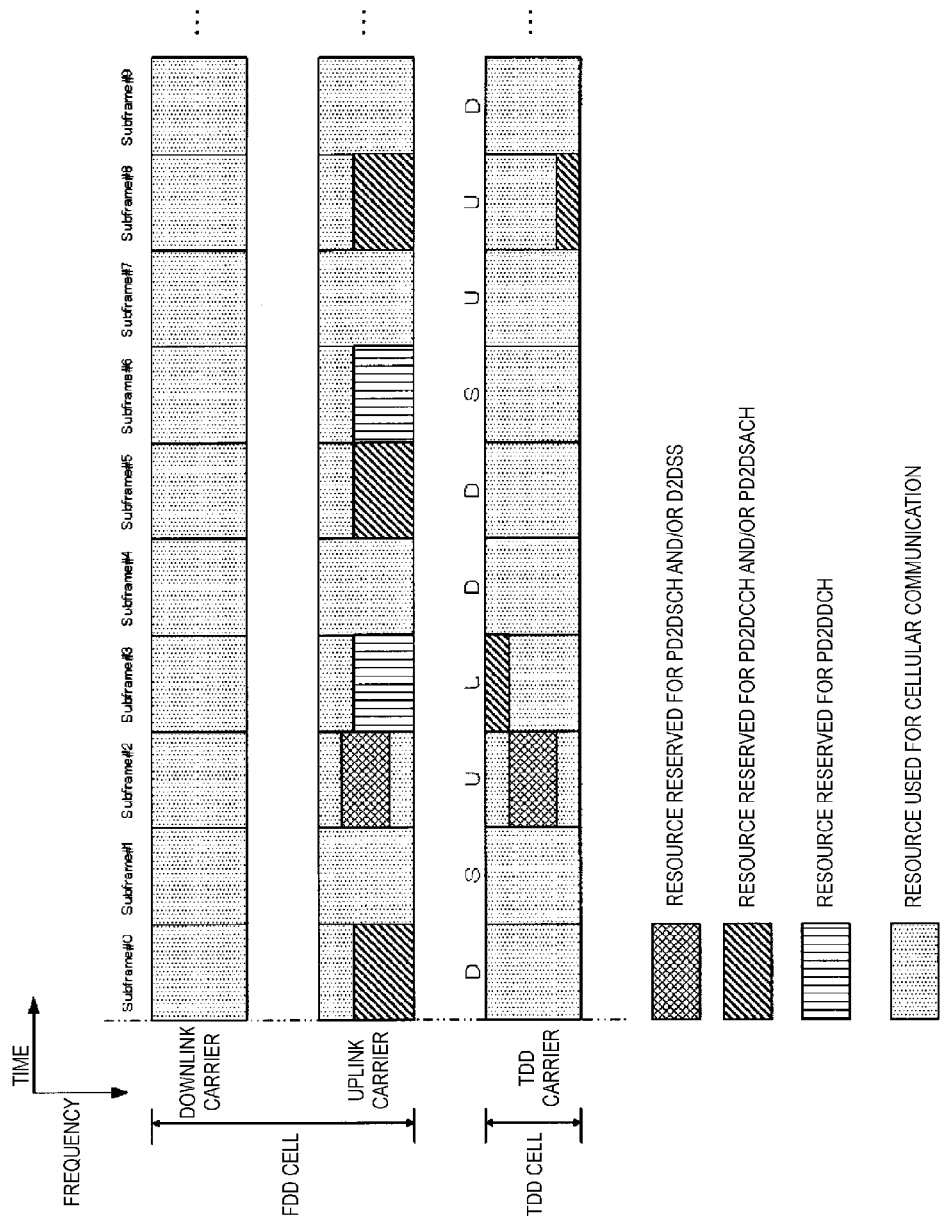
FIG. 4 is a diagram illustrating D2D resources.

FIG. 4 is a diagram illustrating D2D resources according to the present embodiment. Resources reserved for D2D may be referred to as D2D resources. In FIG. 4, the horizontal axis is a time axis, and the vertical axis is a frequency axis. In FIG. 4, D denotes a downlink subframe, S denotes a special subframe, and U denotes an uplink subframe. Here, a single FDD cell corresponds to a single downlink carrier and a single uplink carrier. A single TDD cell may correspond to a single TDD carrier.

In the FDD cell, a downlink signal to be used for cellular communication is mapped to subframes of the downlink carrier, and an uplink signal to be used for cellular communication is mapped to a subframe of the uplink carrier. In the FDD cell, a D2D signal to be used for D2D may be mapped to a subframe of the uplink carrier.

Here, a carrier corresponding to a cell in the downlink is referred to as a downlink component carrier. A carrier corresponding to a cell in the uplink is referred to as an uplink component carrier. A TDD carrier is a downlink component carrier and is also an uplink component carrier.

In the TDD cell, a downlink signal to be used for cellular communication is mapped to downlink subframes and DwPTS, and an uplink signal to be used for cellular communication is mapped to an uplink subframe and UpPTS. In the TDD cell, a D2D signal to be used for D2D may be mapped to an uplink subframe and UpPTS.

The base station device 3 controls D2D resources reserved for D2D. The base station device 3 may reserve some of the resources of the uplink carrier in the FDD cell, as D2D resources. The base station device 3 may reserve some of the resources in uplink subframes and UpPTSs in the TDD cell, as D2D resources.

The base station device 3 may transmit a higher layer signal including information indicating the set of D2D resources (also referred to as a resource pool or a pool) reserved in each of the cells, to the terminal device 1. For example, the information indicating the set of D2D resources may be included in SystemInformationBlock-Type18. For example, the terminal device 1 may set a parameter D2D-ResourceConfig indicating the D2D resources reserved for each of the cells, in accordance with the higher layer signal received from the base station device 3. Specifically, the base station device 3 may set the parameter D2D-ResourceConfig indicating the D2D resources reserved in each of the cells, to the terminal device 1 via the higher layer signal.

Here, the PSBCH and the SSS may be transmitted over 62 subcarriers around the center frequency of the uplink component carrier.

The base station device 3 may set one or a plurality of parameters indicating one or a plurality of sets of resources reserved for D2D, to the terminal device 1 via a higher layer signal.

Here, the sets of resources reserved for the PSBCH and the SSS, the PSDCH, the PSSCH, and/or the PSCCH may be configured individually. The sets of resources reserved for the PSDCH, the PSSCH, and/or the PSCCH may be configured individually.

Sets of D2D resources (referred to also as a resource pool or a pool) for D2D discovery type 1, D2D discovery type 2, D2D communication mode 1, and/or D2D communication mode 2 may be configured individually. Sets of D2D resources for D2D transmission (also referred to as a transmission resource pool or a transmission pool) and sets of D2D resources for D2D reception (also referred to as a reception resource pool or a reception pool) may be configured individually.

For example, a parameter for configuring the transmission resource pool and/or a parameter for configuring the reception resource pool may be included in SystemInformation-BlockType18. The parameter for configuring the transmission resource pool and/or the parameter for configuring the reception resource pool may be included in a dedicated message.

From the viewpoint of the terminal device 1, some of the above-described resource sets may be transparent. For example, since the PSSCH is scheduled using the SCI, the terminal device 1 does not need to configure any resource set for receiving/monitoring the PSSCH.

FIGS. 5A to 5C illustrate examples of a method of transmitting the PSBCH/SSS. Here, the PSBCH/SSS denotes the PSBCH and/or the SSS. Specifically, FIGS. 5A to 5C illustrate examples of a method of transmitting the PSBCH and/or a method of transmitting the SSS. For example, the PSBCH/SSS is periodically transmitted in the subframes configured by the base station device 3.

FIG. 5A illustrates an example in which the PSBCH/SSS is periodically transmitted in the first subframes (or part of the first subframes) of configured periodic resource pools.

Here, in FIG. 5A, the configured periodic resource pools may be configured for D2D discovery.

For example, as illustrated in FIG. 5A, the PSBCH/SSS may be transmitted in the first subframe of periodic resource pools (at intervals of 20 subframes) configured for D2D discovery. In other words, the subframe for the transmission of the PSBCH/SSS may be configured in association with the resource pool for D2D discovery. The PSBCH/SSS transmitted in the subframe configured in association with the resource pool for D2D discovery may be PSBCH/SSS for D2D discovery.

Here, although the PSBCH/SSS is transmitted only in the first subframes of the configured periodic resource pools in FIG. 5A, the PSBCH/SSS may be transmitted in a subframe other than the first subframe. The PSBCH/SSS may be periodically transmitted in a single resource pool within the configured periodic resource pools.

For example, a period (for example, intervals of 5 subframes) is configured for transmission of the PSBCH/SSS, and the PSBCH/SSS may be periodically transmitted in a single resource pool in accordance with the configured intervals. The PSBCH/SSS may be periodically (for example, at intervals of 5 subframe) transmitted in a single resource pool within periodic resource pools (for example, at intervals of 20 subframes) configured for D2D discovery.

Here, in this operation, the period for the transmission of the PSBCH/SSS may be configured so as to include resources (subframes) to be used for cellular communication. Alternatively, in this operation, the period for the transmission of the PSBCH/SSS may be configured in consideration only of the subframes in a single resource pool.

The PSBCH/SSS transmitted as described with reference to FIG. 5A (for example, the PSBCH/SSS transmitted in the first subframes of the periodic resource pools configured for D2D discovery) is also referred to as a first PSBCH/first SSS below. For example, the base station device 3 may control the transmission of the first PSBCH/first SSS using first information (first parameter) included in a higher layer signal.

FIG. 5B illustrates an example in which the PSBCH/SSS is periodically transmitted in subframes of configured periodic resource pools. Here, in FIG. 5B, the configured periodic resource pool may be configured for D2D communication.

For example, as illustrated in FIG. 5B, the PSBCH/SSS may be transmitted in subframes of periodic resource pools (at intervals of 10 subframes) configured for D2D communication. In other words, the subframe for the transmission of the PSBCH/SSS may be configured in association with the resource pool for D2D communication. The PSBCH/SSS transmitted in the subframe configured in association with the resource pool for D2D communication may be PSBCH/SSS for D2D communication.

The PSBCH/SSS transmitted as described with reference to FIG. 5B (for example, the PSBCH/SSS transmitted in subframes of the periodic resource pools configured for D2D communication) is also referred to as a second PSBCH/second SSS below.

For example, the base station device 3 may control the transmission of the second PSBCH/second SSS using the second information (second parameter) included in a higher layer signal. For example, the base station device 3 may provide an instruction regarding a subframe of the periodic resource pool configured for D2D communication to be used for the transmission of the PSBCH/SSS, by configuring a period and/or offset for the transmission of the PSBCH/SSS.

FIG. 5C illustrates an example in which the PSBCH/SSS is periodically transmitted in configured periodic subframes. Specifically, FIG. 5C illustrates an example in which a subframe for the transmission of the PSBCH/SSS is configured with no association with resource pools (resource pool for D2D discovery and/or resource pool for D2D communication).

For example, as illustrated in FIG. 5C, the PSBCH/SSS may be transmitted in configured periodic subframes (at intervals of 5 subframes). The PSBCH/SSS transmitted in the subframe configured with no association with resource pools (resource pool for D2D discovery and/or resource pool for D2D communication) may be PSBCH/SSS for D2D communication. The PSBCH/SSS transmitted in the subframe configured with no association with resource pools (resource pool for D2D discovery and/or resource pool for D2D communication) may be PSBCH/SSS for D2D.

The PSBCH/SSS transmitted as described with reference to FIG. 5C (for example, the PSBCH/SSS to be transmitted in configured periodic subframes) is also referred to as a third PSBCH/third SSS below.

For example, the base station device 3 may control the transmission of the third PSBCH/third SSS using the third information (third parameter) included in a higher layer signal. For example, the base station device 3 may provide an instruction regarding a subframe for the periodic transmission of the PSBCH/SSS, by configuring a period and/or offset for the transmission of the PSBCH/SSS. When the subframe specified by the base station device 3 is a subframe in a resource pool configured for D2D communication, the terminal device 1 may transmit the PSBCH/SSS. When the subframe specified by the base station device 3 is a subframe in a resource pool configured for D2D, the terminal device 1 may transmit the PSBCH/SSS.

As described above, the PSBCH/SSS may be transmitted as described with reference to FIG. 5A, FIG. 5B, and/or FIG. 5C. For example, the base station device 3 may make such a configuration as to transmit the PSBCH/SSS in the transmission method described with reference to FIG. 5A and the transmission method described with reference to FIG. 5B. Alternatively, the base station device 3 may make such a configuration as to transmit the PSBCH/SSS in the transmission method described with reference to FIG. 5A and the transmission method described with reference to FIG. 5C. Here, a single PSBCH/SSS may be transmitted for D2D discovery and D2D communication. In other words, a single PSBCH/SSS may be transmitted for D2D.

In 3GPP, the use of D2D for public safety (PS) has been considered. For example, the base station device 3 may notify the terminal device 1 of whether each set of D2D resources is a set of resources for PS. The terminal device 1 may be authorized to perform D2D for PS via EUTRAN. In other words, the terminal device 1 that has not been authorized to perform D2D for PS does not need to perform D2D with the set of resources for PS.

A method of configuring transmit power will be described below.

Here, transmit power control as represented by Math (1) and/or Math (2) may be applied at least to the terminal device 1A within the coverage. Specifically, transmit power (transmit power value) calculated in accordance with Math (1) and/or Math (2) may be used for D2D.

[Math. 1]
$$P_{D2D}(i) = \min\left\{\begin{matrix} P_{CMAX,c}(i), \\ 10\log_{10}(M_{D2D}(i)) + P_{O\_D2D} + \alpha_{D2D} \cdot PL_c \end{matrix}\right\} \quad (1)$$

[Math. 2]
$$P_{D2D}(i) = P_{CMAX,c}(i) \quad (2)$$

Here, $P_{D2D}(i)$ denotes the transmit power (transmit power value) for D2D transmission in subframe i. $P_{CMAX,c}$ denotes the maximum transmit power for D2D transmission in a serving cell c.

$M_{D2D}(i)$ denotes the number of resource blocks scheduled for D2D. $P_{O\_D2D}$ denotes the power obtained by adding target power and the terminal-device-specific power offset to nominal power configurable specifically for a cell. $\alpha_{D2D}$ denotes a path loss compensation factor for a fractional TPC. $PL_c$ denotes a path loss between the base station device 3 and the terminal device 1 in the serving cell c. Here, it may be switched between Math (1) and Math (2) to be used for the calculation of $P_{D2D}(i)$, in accordance with the value set in the field for information associated with the TPC (downlink control information) (for example, 0 or 1 set in a one-bit field). For example, the information associated with the TPC (downlink control information) is transmitted on the PDCCH or EPDCCH. For example, the information associated with the TPC (downlink control information) is included in a D2D grant.

$P_{O\_D2D}$ may be target power to nominal power configurable specifically for a cell. $PL_c$ may be a path loss in the D2D link (path loss between the terminal devices 1). $PL_c$ may be a path loss from the synchronization source for transmitting D2DSS. As described above, the synchronization source may be the base station device or the terminal device 1.

$P_{O\_D2D}$ and/or $\alpha_{D2D}$ is also referred to as a parameter relating to transmit power below. For example, the parameter relating to transmit power may be given by an uplink power control information element.

Here, a parameter relating to transmit power for D2D discovery and a parameter relating to transmit power for D2D communication may be configured individually. Specifically, a parameter for transmit power for the transmission on the PSDCH and a parameter for transmit power for the transmission on the PSCCH/PSSCH (PSCCH and/or PSSCH) may be configured individually.

Further, a parameter for transmit power for the transmission on the PSDCH, a parameter for transmit power for the transmission on the PSSCH, and/or a parameter for transmit power for the transmission on the PSCCH may be configured individually. Here, a single common parameter relating to transmit power may be configured as the parameter for transmit power for the transmission on the PSDCH and the transmission on the PSCCH. A single common parameter relating to transmit power may be configured as the parameter for transmit power for the transmission of the PSSCH and the transmission of the PSCCH.

A parameter relating to transmit power for D2D discovery type 1, a parameter relating to transmit power for D2D discovery type 2, a parameter relating to transmit power for D2D communication mode 1, and a parameter relating to transmit power for D2D communication mode 2 may be configured individually.

A parameter relating to transmit power for the transmission on the PSBCH/SSS, a parameter relating to transmit power for the transmission on the PSDCH, and/or a parameter relating to transmit power for the transmission on the PSSCH may be configured individually. Here, a single common parameter relating to transmit power may be configured as the parameter relating to transmit power for the transmission on the PSBCH/SSS and the transmission on the PSDCH. A single common parameter relating to transmit power may be configured as the parameter relating to transmit power for the transmission on the PSBCH/SSS and the transmission on the PSSCH.

For example, the base station device 3 may include a parameter relating to transmit power, like the above-described parameters, (information for configuring a parameter relating to transmit power) in a higher layer signal and transmit the higher layer signal. For example, the parameter relating to transmit power may be included in SystemInformationBlockType18. The parameter relating to transmit power may be included in an RRC message (for example, a dedicated message).

The transmit power of the SDMRS associated with the PSDCH is the same as the transmit power of the PSDCH. The transmit power of the SDMRS associated with the PSCCH is the same as the transmit power of the PSCCH. The transmit power of the SDMRS associated with the PSSCH is the same as the transmit power of the PSSCH.

The transmit power of the PSSS associated with the PSBCH is the same as the transmit power of the PSBCH. The transmit power of the SSSS associated with the PSBCH may be the same as the transmit power of the PSBCH. The transmit power of the SSSS associated with the PSBCH may be lower than the transmit power of the PSBCH by a prescribed value. The prescribed value may be predetermined. The prescribed value may be configured by a higher layer.

As will be described below, the parameter relating to transmit power may be configured for each authorized range. For example, a plurality of ranges (high, medium, and low) may be defined as authorized ranges. The details will be described below.

A method of configuring $P_{CMAX,\,c}$ will be described below.

The maximum transmit power $P_{CMAX,\,c}$ for the transmission of D2D communication and the maximum transmit power $P_{CMAX,\,c}$ for the transmission of D2D discovery may be configured individually. Specifically, the maximum transmit power $P_{CMAX,\,c}$ for the transmission on the PSCCH or the PSSCH and the maximum transmit power $P_{CMAX,\,c}$ for the transmission on the PSDCH may be configured individually.

The maximum transmit power $P_{CMAX,\,c}$ for the PSBCH and the maximum transmit power $P_{CMAX,\,c}$ for the PSCCH, the PSSCH, and the PSBCH may be configured individually.

The maximum transmit power $P_{CMAX,\,c}$ for the PSBCH, the maximum transmit power $P_{CMAX,\,c}$ for the PSCCH and the PSSCH, and the maximum transmit power $P_{CMAX,\,c}$ for the PSDCH may be configured individually.

The terminal device 1 may set the configured maximum output power $P_{CMAX,\,c}$ for a certain cell. Here, the maximum output power may be the maximum transmit power. For example, $P_{CMAX,\,c}$ may be set in accordance with Math (3).

[Math. 3]

$$P_{CMAX\_L,c} \leq P_{CMAX,c} \leq P_{CMAX\_H,c} \text{ with}$$

$$P_{CMAX\_L,c} = \text{MIN}\{P_{HMAX,c} - \Delta T_{C,c}, P_{PowerClass} - \text{MAX}(MPRc - A - MPRc + \Delta T_{H,c} + \Delta T_{C,c}, P - MPRc)\}$$

$$P_{CMAX\_H,c} = \text{MIN}\{P_{EMAX,c}, P_{PowerClass}\} \quad (3)$$

Here, $P_{EMAX,\,c}$ is a value given based on configured P-Max (parameter for configuring P-Max) for the certain cell. P-Max may be given based on a P-MAX information element. For example, any value ranging from −30 to 33 (integer value) may be given as P-Max.

Specifically, P-Max may be used to limit transmit power of the uplink or sidelink of the terminal device 1 on a carrier frequency (also referred to as "to limit the UE's uplink or sidelink transmission power on a carrier frequency"). P-Max may be used to give a cell selection criterion. For example, P-Max may be used to calculate a parameter (also referred to as the parameter: Pcompensation) to be used for the calculation of determining whether the cell selection criterion is satisfied.

In other words, the parameter: P-Max corresponds to the parameter: $P_{EMAX,\,c}$. The transmit power of the terminal device 1 (also referred to as UE transmit power) is determined in accordance with a value defined in accordance with Math (3). In other words, the transmit power of the terminal device 1 in a single serving cell does not exceed the configured maximum output power of the serving cell defined in accordance with Math (3).

As will be described below, P-Max (parameter for configuring P-Max) may be configured for each authorized range. The details will be described below.

$P_{PowerClass}$ denotes the maximum terminal power (also referred to as the maximum UE power). For example, $P_{PowerClass}$ may be given by the power classes of the terminal device 1 (also referred to as "UE power classes define the maximum output power") that define the maximum output power for a transmission bandwidth.

$MPR_c$ (maximum power reduction) denotes the allowed maximum output power reduction (reduction amount) for the maximum output power for the certain cell. Here, $MPR_C$ results from higher order modulation (for example, a modulation scheme, such as QPSK or 16 QAM). $MPR_C$ also results from transmission of the configuration (resource block) of the bandwidth. In other words, $MPR_C$ denotes the terminal maximum output power for the modulation and/or channel bandwidth. $APR_c$ (additional maximum power reduction) denotes the additional maximum power reduction (reduction amount) for the certain cell.

$\Delta T_{IB,\,c}$ denotes the additional tolerance for the certain cell. $\Delta T_{C,\,c}$ is 1.5 dB or 0 dB, for example. P-$MPR_c$ denotes the allowed maximum output power reduction (reduction amount).

In 3GPP, the use of an authorized range for D2D has been considered. In other words, the range to which authorization is given may be used for D2D. Specifically, the parameter: P-MAX/$P_{EMAX,\,c}$ corresponding to the approved (authorized or allowed) range may be used for D2D.

For example, a plurality of ranges (a plurality of range classes) as authorized ranges may be supported in accordance with service requirements, and the plurality of range classes may be applied to D2D. For example, three range classes, high (long), medium (middle), and low (short) may be supported as authorized ranges, and the terminal device 1 may be allowed to perform D2D on the basis of any of the three ranges. The maximum transmit power in accordance with the authorized ranges may be configured (defined or specified) for D2D.

Specifically, the terminal device 1 to which the range: high is authorized may perform D2D in accordance with the transmit power value corresponding to the range: high. The terminal device 1 to which the range: medium is authorized may perform D2D in accordance with the transmit power value corresponding to the range: medium. The terminal device 1 to which the range: low is authorized may perform D2D in accordance with the transmit power value corresponding to the range: low. In such a case, transmit power control may be performed.

Here, the authorized range (information on the authorized range) may be provided (configured, defined, or specified) by the ProSe function (Prose function). The authorized range may be provided as authorization policy.

For example, the authorized range may be defined for each operator (public land mobile network: PLMN). The authorized range may be defined for each cell. The authorized range may be defined for each terminal device 1. The authorized range may be defined for each application.

For example, the authorized range may be applied to D2D discovery. The authorized range may be applied only to the transmission of D2D data (SL-DCH) corresponding to D2D discovery. In other words, the authorized range may be applied only to the transmission on the PSDCH.

For example, the authorized range may be applied to D2D communication. The authorized range may be applied only to the transmission of D2D data (SL-DCH)/SCI corresponding to D2D communication. In other words, the authorized range may be applied only to the transmission on the PSSCH/PSCCH.

For example, the authorized range may be applied to the transmission of the PSBCH/SSS. Here, the authorized range does not need to be applied to the transmission of the PSBCH/SSS. For example, the configured maximum transmit power may be applied to the transmission of the PSBCH/SSS to which the authorized range has not been applied. In other words, the authorized range does not need to be defined for the transmission of the PSBCH/SSS.

The authorized range may be defined for each of D2D discovery and D2D communication. The authorized range may be defined for each of D2D transmission and D2D reception. The authorized range may be defined for D2D transmission and does not need to be defined for D2D reception.

The three ranges, high, medium, and low will be described below as an example of the plurality of range classes (plurality of authorized ranges) to be used as authorized ranges. However, it is needless to say that the present embodiment is applicable as long as the ranges are configured similarly.

An example of a method of configuring (indicating, specifying, determining, or providing) the authorized ranges will be described below.

The following method of configuring the authorized ranges may be applied only to D2D discovery or D2D communication. The following method of configuring the authorized ranges may be applied to D2D discovery and D2D communication individually.

Here, the base station device 3 may configure, using a higher layer signal, P-Max (parameter for configuring P-Max) corresponding to each of the plurality of authorized ranges. Here, a parameter for configuring P-Max may be included in the parameter relating to transmit power.

For example, the base station device 3 may configure P-Max corresponding to the authorized range: high (also referred to as P-Max-High below). The base station device 3 may configure P-Max corresponding to the authorized range: medium (also referred to as P-Max-Medium below). The base station device 3 may configure P-Max corresponding to the authorized range: low (also referred to as P-Max-Low below).

The base station device 3 may configure, using a higher layer signal, a parameter relating to transmit power corresponding to each of the plurality of authorized ranges. For example, the base station device 3 may configure a parameter relating to transmit power corresponding to the authorized range: high (also referred to as $P_{O\_D2D}$-High and/or $\alpha_{D2D}$-High below). The base station device 3 may configure a parameter relating to transmit power corresponding to the authorized range: medium (also referred to as $P_{O\_D2D}$-Medium and/or amp-Medium below). The base station device 3 may configure a parameter relating to transmit power corresponding to the authorized range: low (also referred to as $P_{O\_D2D}$-Low and/or $\alpha_{D2D}$-Low below).

Here, the base station device 3 may configure, using a higher layer signal, a parameter for configuring a transmission resource pool corresponding to each of the plurality of authorized ranges. For example, the base station device 3 may configure a parameter for configuring a transmission resource pool corresponding to the authorized range: high (also referred to as TxResourcePool-High below). The base station device 3 may configure a parameter for configuring a transmission resource pool corresponding to the authorized range: medium (also referred to as TxResourcePool-Medium below). The base station device 3 may configure a parameter for configuring a transmission resource pool corresponding to the authorized range: low (also referred to as TxResourcePool-Low below).

FIG. 6 is a diagram illustrating an example of a SystemInformationBlockType18 information element (IE). Here, FIG. 6 is an example, and part of the information illustrated in FIG. 6 may be included in SystemInformationBlockType18. Part of the information illustrated in FIG. 6 may be configured in a cell-specific manner. Part of the information illustrated in FIG. 6 may be configured in a UE-specific manner.

As illustrated in FIG. 6, the SystemInformationBlockType18 information element may include a first parameter (Idle-P-Max), a second parameter (Idle-UplinkPowerControl), a third parameter (Idle-TxResourcePool), and/or a fourth parameter (RxResourcePool) as parameters (Config-SIB-r12) common to the plurality of the terminal devices 1.

Here, the first parameter (Idle-P-Max), the second parameter (Idle-UplinkPowerControl), and/or the third parameter (Idle-TxResourcePool) is used by the terminal device 1 that is in an idle state (also referred to as an RRC idle state). Specifically, the first parameter (Idle-P-Max), the second parameter (Idle-UplinkPowerControl), and/or the third parameter (Idle-TxResourcePool) is used by the terminal device 1 that has been camped on the cell and has not been RRC-connected (also referred to as an RRC-connected state).

Here, the first parameter (Idle-P-Max) corresponds to the above-described parameter for configuring P-MAX. The second parameter (Idle-UplinkPowerControl) corresponds to the above-described parameter relating to transmit power. The third parameter (Idle-TxResourcePool) corresponds to the above-described parameter for configuring a transmission resource pool.

The fourth parameter (RxResourcePool) may be used by the terminal device 1 that is in an idle state. The fourth parameter (RxResourcePool) may be used by the terminal device 1 that has been RRC-connected. Here, the fourth parameter (RxResourcePool) corresponds to the above-described parameter for configuring a reception resource pool.

Here, as described above, the first parameter (Idle-P-Max) may be configured for each of the plurality of authorized ranges. Specifically, as illustrated in FIG. 6, the first parameter (Idle-P-Max) may include a fifth parameter (Idle-P-MAX-High), a sixth parameter (Idle-P-MAX-Medium), and/or a seventh parameter (Idle-P-MAX-Low). Here, the first parameter (Idle-P-MAX) transmitted using SystemInformationBlockType18 may always include the three parameters for configuring P-MAX, the fifth parameter (Idle-P-MAX-High), the sixth parameter (Idle-P-MAX-Medium), and the seventh parameter (Idle-P-MAX-Low).

In other words, when the third parameter (Idle-TxResourcePool) is included in SystemInformationBlockType18, the terminal device 1 can perform D2D transmission on the basis of any one or a plurality of the fifth parameter (Idle-P-MAX-High), the sixth parameter (Idle-P-MAX-Medium), and the seventh parameter (Idle-P-MAX-Low).

Here, the authorized ranges may depend on applications, for example. For example, the terminal device 1 may perform D2D using the ranges authorized to each application.

For example, when executing a first application authorized to be executed with the range: high, the terminal device 1 may perform D2D transmission in accordance with the fifth parameter (Idle-P-MAX-High). When executing a second application authorized to be executed with the range: low, the terminal device 1 may perform D2D transmission in accordance with the seventh parameter (Idle-P-MAX-Low).

As described above, the second parameter (Idle-UplinkPowerControl) may be configured for each of the plurality of authorized ranges. Specifically, as illustrated in FIG. 6, the second parameter (Idle-UplinkPowerControl) may include an eighth parameter (Idle-$P_{O\_D2D}$-High), a ninth parameter (Idle-$P_{O\_D2D}$-Medium), and/or a tenth parameter (Idle-$P_{O\_D2D}$-Low). The second parameter (Idle-UplinkPowerControl) may include an eleventh parameter (Idle-α-High), a twelfth parameter (Idle-α-Medium), and/or a thirteenth parameter (Idle-α-Low).

Here, the second parameter (Idle-UplinkPowerControl) to be transmitted using SystemInformationBlockType18 may always include the eighth parameter (Idle-$P_{O\_D2D}$-High), the ninth parameter (Idle-$P_{O\_D2D}$-Medium), and the tenth parameter (Idle-$P_{O\_D2D}$-Low). The second parameter (Idle-UplinkPowerControl) to be transmitted using SystemInformationBlockType18 may always include the eleventh parameter (Idle-α-High), the twelfth parameter (Idle-a-Medium), and the thirteenth parameter (Idle-α-Low). In other words, the second parameter (Idle-UplinkPowerControl) to be transmitted using SystemInformationBlockType18 may always include the three and/or six parameters relating to transmit power.

Specifically, when SystemInformationBlockType18 includes the third parameter (Idle-TxResourcePool), the terminal device 1 can perform D2D transmission in accordance with any one or a plurality of the eighth parameter (Idle-$P_{O\_D2D}$-High), the ninth parameter (Idle-$P_{O\_D2D}$-Medium), and the tenth parameter (Idle-$P_{O\_D2D}$-Low). When SystemInformationBlockType18 includes the third parameter (Idle-TxResourcePool), the terminal device 1 can perform D2D transmission in accordance with any one or a plurality of the eleventh parameter (Idle-α-High), the twelfth parameter (Idle-α-Medium), and the thirteenth parameter (Idle-α-Low).

For example, when executing the first application authorized to be executed with the range: high, the terminal device 1 may perform D2D transmission in accordance with the eighth parameter (Idle-$P_{O\_D2D}$-High) and/or the eleventh parameter (Idle-α-High). When executing the second application authorized to be executed with the range: low, the terminal device 1 may perform D2D transmission in accordance with the tenth parameter (Idle-$P_{O\_D2D}$-Low) and/or the thirteenth parameter (Idle-α-Low).

Here, as described above, the third parameter (Idle-TxResourcePool) may be configured for each of the plurality of authorized ranges. Specifically, as illustrated in FIG. 6, the third parameter (Idle-TxResourcePool) may include a fourteenth parameter (Idle-TxResourcePool-High), a fifteenth parameter (Idle-TxResourcePool-Medium), and/or a sixteenth parameter (Idle-TxResourcePool-Low).

Here, the third parameter (Idle-TxResourcePool) to be transmitted using SystemInformationBlockType18 may always include the fourteenth parameter (Idle-TxResourcePool-High), the fifteenth parameter (Idle-TxResourcePool-Medium), and the sixteenth parameter (Idle-TxResourcePool-Low). In other words, the third parameter (Idle-TxResourcePool) to be transmitted using SystemInformationBlockType18 may always include the three parameters for configuring transmission resource pools.

Specifically, when SystemInformationBlockType18 includes the third parameter (Idle-TxResourcePool), the terminal device 1 can perform D2D transmission using the transmission resource pool in accordance with any one or a plurality of the fourteenth parameter (Idle-TxResourcePool-High), the fifteenth parameter (Idle-TxResourcePool-Medium), and the sixteenth parameter (Idle-TxResourcePool-Low).

For example, when executing the first application authorized to be executed with the range: high, the terminal device 1 may perform D2D transmission using the transmission resource pool in accordance with the fourteenth parameter (Idle-TxResourcePool-High). When executing the second application authorized to be executed with the range: low, the terminal device 1 may perform D2D transmission using the transmission resource pool in accordance with the sixteenth parameter (Idle-TxResourcePool-Low).

FIG. 7 is a diagram illustrating an example of a dedicated message information element (IE). Here, FIG. 7 is an example, and part of the information illustrated in FIG. 7 may be included in the dedicated message. Part of the information illustrated in FIG. 7 may be configured in a cell-specific manner. Part of the information illustrated in FIG. 7 may be configured in a UE-specific manner.

As illustrated in FIG. 7, the dedicated message information element may include a seventeenth parameter (Connected-P-MAX), an eighteenth parameter (Connected-UplinkPowerControl), and/or a nineteenth parameter (Connected-TxResourcePool) as parameters (Config-dedicated-r12) dedicated to the terminal device 1. Here, the dedicated message does not need to include any parameter for configuring a reception resource pool.

The seventeenth parameter (Connected-P-MAX), the eighteenth parameter (Connected-UplinkPowerControl), and/or the nineteenth parameter (Connected-TxResourcePool) is used by the terminal device 1 that has been RRC-connected.

Here, the seventeenth parameter (Connected-P-MAX) corresponds to the above-described parameter for configuring P-MAX. The eighteenth parameter (Connected-UplinkPowerControl) corresponds to the above-described parameter relating to transmit power. The nineteenth parameter (Connected-TxResourcePool) corresponds to the above-described parameter for configuring a transmission resource pool.

Here, as described above, the seventeenth parameter (Connected-P-MAX) may be configured for each of the plurality of authorized ranges. Specifically, as illustrated in FIG. 7, the seventeenth parameter (Connected-P-MAX) includes a twentieth parameter (Connected-P-MAX-High), a twenty-first parameter (Connected P-MAX-Medium), and/or a twenty-second parameter (Connected-P-MAX-Low). Here, the seventeenth parameter (Connected-P-MAX) to be transmitted using the dedicated message may include any one or a plurality of the twentieth parameter (Connected-P-MAX-High), the twenty-first parameter (Connected P-MAX-Medium), and/or the twenty-second parameter (Connected-P-MAX-Low).

In other words, the seventeenth parameter (Connected-P-MAX) to be transmitted using the dedicated message does not necessarily need to include the three parameters, the twentieth parameter (Connected-P-MAX-High), the twenty-first parameter (Connected P-MAX-Medium), and the twenty-second parameter (Connected-P-MAX-Low), for configuring P-MAX.

Specifically, when the dedicated message includes the nineteenth parameter (Connected-TxResourcePool), the terminal device 1 can perform D2D transmission in accordance with any one or a plurality of the twentieth parameter (Connected-P-MAX-High), the twenty-first parameter (Connected P-MAX-Medium), and the twenty-second parameter (Connected-P-MAX-Low).

For example, when executing the first application authorized to be executed with the range: high, the terminal device 1 may perform D2D transmission in accordance with the twentieth parameter (Connected-P-MAX-High). When executing the second application authorized to be executed with the range: low, the terminal device 1 may perform D2D transmission in accordance with the twenty-second parameter (Connected-P-MAX-Low).

As described above, the eighteenth parameter (Connected-UplinkPowerControl) may be configured for each of the plurality of authorized ranges. Specifically, as illustrated in FIG. 7, the eighteenth parameter (Connected-UplinkPowerControl) may include a twenty-third parameter (Connected-$P_{O\_D2D}$-High), a twenty-fourth parameter (Connected-$P_{O\_D2D}$-Medium), and/or a twenty-fifth parameter (Connected-$P_{O\_D2D}$-Low). The eighteenth parameter (Connected-UplinkPowerControl) may include a twenty-sixth parameter (Connected-α-High), a twenty-seventh parameter (Connected-α-Medium), and/or a twenty-eighth parameter (Connected-α-Low).

Here, the eighteenth parameter (Connected-UplinkPowerControl) to be transmitted using the dedicated message includes any one or a plurality of the twenty-third parameter (Connected-$P_{O\_D2D}$-High), the twenty-fourth parameter (Connected-$P_{O\_D2D}$-Medium), and/or the twenty-fifth parameter (Connected-$P_{O\_D2D}$-Low). In other words, the eighteenth parameter (Connected-UplinkPowerControl) to be transmitted using the dedicated message does not necessarily need to include the twenty-third parameter (Connected-$P_{O\_D2D}$-High), the twenty-fourth parameter (Connected-$P_{O\_D2D}$-Medium), and the twenty-fifth parameter (Connected-$P_{O\_D2D}$-Low).

The eighteenth parameter (Connected-UplinkPowerControl) to be transmitted using the dedicated message includes any one or a plurality of the twenty-sixth parameter (Connected-α-High), the twenty-seventh parameter (Connected-α-Medium), and/or the twenty-eighth parameter (Connected-α-Low). In other words, the eighteenth parameter (Connected-UplinkPowerControl) to be transmitted using the dedicated message does not necessarily need to include the twenty-sixth parameter (Connected-α-High), the twenty-seventh parameter (Connected-α-Medium), and the twenty-eighth parameter (Connected-α-Low).

Specifically, when the dedicated message includes the nineteenth parameter (Connected-TxResourcePool), the terminal device 1 can perform D2D transmission in accordance with any one or a plurality of the twenty-third parameter (Connected-$P_{O\_D2D}$-High), the twenty-fourth parameter (Connected-$P_{O\_D2D}$-Medium), and the twenty-fifth parameter (Connected-$P_{O\_D2D}$-Low). When the dedicated message includes the nineteenth parameter (Connected-TxResourcePool), the terminal device 1 can perform D2D transmission in accordance with one or a plurality of the twenty-sixth parameter (Connected-α-High), the twenty-seventh parameter (Connected-α-Medium), and the twenty-eighth parameter (Connected-α-Low).

For example, when executing the first application authorized to be executed with the range: high, the terminal device 1 may perform D2D transmission in accordance with the twenty-third parameter (Connected-$P_{O\_D2D}$-High) and/or the twenty-sixth parameter (Connected-α-High). When executing the second application authorized to be executed with the range: low, the terminal device 1 may perform D2D transmission in accordance with the twenty-fifth parameter (Connected-$P_{O\_D2D}$-Low) and/or the twenty-eighth parameter (Connected-α-Low).

As described above, the nineteenth parameter (Connected-TxResourcePool) may be configured for each of the plurality of authorized ranges. Specifically, as illustrated in FIG. 7, the nineteenth parameter (Connected-TxResourcePool) may include a twenty-ninth parameter (Connected-TxResourcePool-High), a thirtieth parameter (Connected-TxResourcePool-Medium) and/or a thirty-first parameter (Connected-TxResourcePool-Low).

Here, the nineteenth parameter (Connected-TxResourcePool) to be transmitted using the dedicated message includes any one or a plurality of the twenty-ninth parameter (Connected-TxResourcePool-High), the thirtieth parameter (Connected-TxResourcePool-Medium), and the thirty-first parameter (Connected-TxResourcePool-Low). In other words, the nineteenth parameter (Connected-TxResourcePool) to be transmitted using the dedicated message does not necessarily need to include the twenty-ninth parameter (Connected-TxResourcePool-High), the thirtieth parameter (Connected-TxResourcePool-Medium), and the thirty-first parameter (Connected-TxResourcePool-Low).

Specifically, when the dedicated message includes the nineteenth parameter (Connected-TxResourcePool), the terminal device 1 can perform D2D transmission using a transmission resource in accordance with any one or a plurality of the twenty-ninth parameter (Connected-TxResourcePool-High), the thirtieth parameter (Connected-TxResourcePool-Medium), and the thirty-first parameter (Connected-TxResourcePool-Low).

For example, when executing the first application authorized to be executed with the range: high, the terminal device 1 may perform D2D transmission using the transmission resource pool in accordance with the twenty-ninth parameter (Connected-TxResourcePool-High). When executing the second application authorized to be executed with the range: low, the terminal device 1 may perform D2D transmission using the transmission resource pool in accordance with the thirty-first parameter (Connected-TxResourcePool-Low).

In view of the above description, operations in the terminal device 1 will be described. Basically, description is given of the operation in the terminal device 1 below. However, it is needless to say that the base station device 3 performs operations corresponding to the operations of the terminal device 1.

FIG. 8 is a diagram illustrating exemplary operations in the terminal device 1. As illustrated in FIG. 8, when the terminal device 1 having the D2D capability is configured to perform D2D transmission (also referred to as announcement) by a higher layer (for example, a layer higher than the RRC layer), the terminal device 1 may operate as follows. Here, the operations in the terminal device 1 illustrated in FIG. 8 are exemplary, and it is needless to say that the present embodiment is applicable as long as similar operations are performed.

1> If the terminal device 1 is camped or RRC-connected, the terminal device 1 may perform an operation described in 2-1> or 2-2>. Here, the higher layer may make such a configuration as to perform a certain D2D activity only when the terminal device 1 is authorized to perform D2D transmission. The terminal device 1 may perform D2D transmission only when the ranges: high, medium, and/or low is authorized.

2-1> If the terminal device 1 is camped, the terminal device 1 may perform the operation described in 3-1> or 3-2>.

3-1> If SystemInformationBlockType18 includes the third parameter (Idle-TxResourcePool), the terminal device 1 may perform the operation described in 4-1>. Specifically, upon receipt of the parameter for configuring a transmission resource pool, the terminal device 1 may perform the operation described in 4-1>.

4-1> The terminal device 1 may select resources from the resource pool (pool of resources) indicated by the third parameter (Idle-TxResourcePool). The terminal device 1 may use the selected resources for D2D transmission. The terminal device 1 may perform D2D transmission using a parameter such as the first parameter, the second parameter, and/or the third parameter described above.

Specifically, for example, the terminal device 1 may perform D2D transmission in accordance with any one or a plurality of the fifth parameter (Idle-P-MAX-High), the sixth parameter (Idle-P-MAX-Medium), and the seventh parameter (Idle-P-MAX-Low).

The terminal device 1 may perform D2D transmission in accordance with any one or a plurality of the eighth parameter (Idle-$P_{0\_D2D}$-High), the ninth parameter (Idle-$P_{0\_D2D}$-Medium), and the tenth parameter (Idle-$P_{0\_D2D}$-Low). The terminal device 1 may perform D2D in accordance with any one or a plurality of the eleventh parameter (Idle-$\alpha$-High), the twelfth parameter (Idle-$\alpha$-Medium), and the thirteenth parameter (Idle-$\alpha$-Low).

The terminal device 1 may perform D2D transmission using the transmission resource pool in accordance with any one or a plurality of the fourteenth parameter (Idle-TxResourcePool-High), the fifteenth parameter (Idle-TxResourcePool-Medium), and the sixteenth parameter (Idle-TxResourcePool-Low).

3-2> If SystemInformationBlockType18 is broadcast (transmitted) and includes a parameter (Config-SIB-r12) while not satisfying the condition in 3-1>, the terminal device 1 may perform the operation described in 4-2>.

4-2> The terminal device 1 may initiate connection establishment (initial connection establishment or connection re-establishment). Specifically, the terminal device 1 may carry out the connection establishment procedure to be RRC-connected (connection establishment procedure for RRC connection). Here, the parameter (Config-SIB-r12) to be transmitted in 3-2> does not include the third parameter (Idle-TxResourcePool).

2-2> If the terminal device 1 is RRC-connected, the terminal device 1 may perform the operation described in 3-3> or 3-4>.

3-3> If the terminal device 1 is configured with the nineteenth parameter (Connected-TxResourcePool), the terminal device 1 may perform the operation described in 4-3>.

4-3> The terminal device 1 uses the resources indicated by the nineteenth parameter (Connected-TxResourcePool) for D2D transmission. The terminal device 1 may then perform D2 transmission using a parameter such as the first parameter, the second parameter, the seventeenth parameter, the eighteenth parameter, and/or the nineteenth parameter described above.

Specifically, for example, the terminal device 1 may perform D2D transmission in accordance with any one or a plurality of the fifth parameter (Idle-P-MAX-High), the sixth parameter (Idle-P-MAX-Medium), and the seventh parameter (Idle-P-MAX-Low).

The terminal device 1 may perform D2D transmission in accordance with any one or a plurality of the eighth parameter (Idle-$P_{0\_D2D}$-High), the ninth parameter (Idle-$P_{0\_D2D}$-Medium), and the tenth parameter (Idle-$P_{0\_D2D}$-Low). The terminal device 1 may perform D2D transmission in accordance with any one or a plurality of the eleventh parameter (Idle-$\alpha$-High), the twelfth parameter (Idle-$\alpha$-Medium), and the thirteenth parameter (Idle-$\alpha$-Low).

Specifically, for example, the terminal device 1 may perform D2D transmission in accordance with any one or a plurality of the twentieth parameter (Connected-P-MAX-High), the twenty-first parameter (Connected-P-MAX-Medium), and the twenty-second parameter (Connected-P-MAX-Low).

The terminal device 1 may perform D2D transmission in accordance with any one or a plurality of the twenty-third parameter (Connected-$P_{0\_D2D}$-High), the twenty-fourth parameter (Connected-$P_{0\_D2D}$-Medium), and the twenty-fifth parameter (Connected-$P_{0\_D2D}$-Low). The terminal device 1 may perform D2D transmission in accordance with any one or a plurality of the twenty-sixth parameter (Connected-$\alpha$-High), the twenty-seventh parameter (Connected-$\alpha$-Medium), and the twenty-eighth parameter (Connected-$\alpha$-Low).

The terminal device 1 may perform D2D transmission using the transmission resource pool in accordance with any one or a plurality of the twenty-ninth parameter (Connected-TxResourcePool-High), the thirtieth parameter (Connected-TxResourcePool-Medium), and the thirty-first parameter (Connected-TxResourcePool-Low).

3-4> If the terminal device 1 is not configured with the nineteenth parameter (Connected-TxResourcePool), the terminal device 1 may perform the operation described in 4-4>.

4-4> The terminal device 1 may request the base station device 3 (or E-UTRAN) to allocate (assign) the resources for the D2D transmission. In other words, the terminal device 1 may request scheduling for the D2D transmission. In other words, the terminal device 1 may request transmission resource pool allocation for the D2D transmission.

For example, the terminal device 1 may transmit a higher layer signal including assistance information to request the base station device 3 to allocate resources for the D2D transmission. Here, for example, the assistance information may be included in an RRC message (or dedicated message). The details of the assistance information will be described below.

Here, 3-4> may be "if SystemInformationBlockType18 is broadcast (transmitted); and includes the parameter (Config-SIB-r12)" (if SystemInformationBlockType18 is broadcast; and includes Config-SIB-r12). In other words, if SystemInformationBlockType18 is transmitted and includes the parameter (Config-SIB-r12) in 3-4>, the terminal device 1 may perform the operation described in 4-4>.

Here, in this case, the terminal device 1 is not configured with the sixteenth parameter (Connected-TxResourcePool). In this case, the parameter (Config-SIB-r12) may include the third parameter (Idle-TxResourcePool). In this case, the parameter (Config-SIB-r12) does not need to include the third parameter (Idle-TxResourcePool).

Although not illustrated in FIG. 8, the terminal device 1 does not need to perform D2D (may give up D2D transmission) if the terminal device 1 does not receive the parameter (Config-SIB-r12) even if the terminal device 1 is configured to perform D2D transmission (announcement) by a higher layer (for example, a layer higher than the RRC layer).

As described above, the terminal device 1 may switch operations depending on whether the third parameter (Idle-TxResourcePool) is included in SystemInformationBlock-Type18 (or the parameter (Config-SIB-r12)). In other words, the terminal device 1 may switch operations depending on whether the terminal device 1 is configured with the third parameter (Idle-TxResourcePool).

Specifically, when the third parameter (Idle-TxResource-Pool) is included, the terminal device 1 may perform D2D transmission in accordance with the authorized range using the specified resources. When the third parameter (Idle-TxResourcePool) is not included, the terminal device 1 that desires to initiate D2D transmission may initiate the connection establishment procedure (must be RRC-connected) and request the base station device 3 (or E-UTRAN) to allocate the resources for the D2D transmission.

Here, as described above, the third parameter (Idle-TxResourcePool) may be used by the terminal device 1 that is in an idle state.

The terminal device 1 may switch operations depending on whether the sixteenth parameter (Connected-TxResourcePool) is included in a dedicated message (or a parameter (Config-Dedicated-r12)). In other words, the terminal device 1 may switch operations depending on whether the terminal device 1 is configured with the sixteenth parameter (Connected-TxResourcePool).

Specifically, when the sixteenth parameter (Connected-TxResourcePool) is included, the terminal device 1 may perform D2D transmission in accordance with the authorized range using the specified resources. When the sixteenth parameter (Connected-TxResourcePool) is not included, the terminal device 1 that desires to initiate D2D transmission may request the base station device 3 (or E-UTRAN) to allocate the resources for the D2D transmission.

As described above, the sixteenth parameter (Connected-TxResourcePool) may be used by the terminal device 1 that has been RRC-connected. The sixteenth parameter (Connected-TxResourcePool) indicates resources to be allocated to the terminal device 1 for the D2D transmission. Here, the resources to be allocated to the terminal device 1 may indicate a pool of resources from which the terminal device 1 selects resources. The resources to be allocated to the terminal device 1 may correspond to an explicitly allocated resource set to be used by the terminal device 1.

The assistance information will be described below.

Here, the assistance information is information to be transmitted from the terminal device 1 to the base station device 3 to assist the base station device 3. For example, the assistance information may include information indicating that D2D has been initiated (information on D2D initiation), information indicating that D2D discovery has been initiated (information on D2D discovery initiation), and/or information indicating that D2D communication has been initiated (information on D2D communication initiation).

The assistance information may include information indicating that there is an interest in D2D (information on the interest in D2D), information indicating that there is an interest in D2D discovery (information on the interest in D2D discovery), and/or information indicating that there is an interest in D2D communication (information on the interest in D2D communication).

The assistance information may include information indicating that authorization has been given (information on authorization). For example, the assistance information may include information indicating the range (high, medium, and/or low) with which the authorization is given. For example, the assistance information may include information indicating that D2D discovery is authorized and/or information indicating that D2D communication is authorized. For example, the assistance information may include information indicating that transmission of D2D discovery is authorized, information indicating that reception of D2D discovery is authorized, information indicating that transmission of D2D communication is authorized, and/or information indicating that reception of D2D communication is authorized.

As described above, for example, the authorized ranges may depend on applications. For example, the terminal device 1 may transmit information indicating that authorization is given with one or a plurality of ranges, as assistance information. For example, the terminal device 1 may transmit information indicating that execution of D2D is authorized with the range: high and information indicating that execution of D2D is authorized with the range: low.

Specifically, for example, the terminal device 1 may transmit information indicating that execution of D2D is authorized with the range: high and information indicating that execution of D2D is authorized with the range: low with both the information included in the assistance information. The base station device 3 may transmit the sixteenth parameter (Connected-TxResourcePool), the seventeenth parameter (Connected-P-MAX-High), and the nineteenth parameter (Connected-P-MAX-Low) with all the parameters included in a dedicated message.

The terminal device 1 may perform D2D transmission in accordance with the seventeenth parameter (Connected-P-MAX-High) using the first transmission resource pool specified with the sixteenth parameter (Connected-TxResourcePool) (for example, the terminal device 1 may execute the first application). The terminal device 1 may perform D2D transmission in accordance with the nineteenth parameter (Connected-P-MAX-Low) using the second transmission resource pool specified with the sixteenth parameter (Connected-TxResourcePool) (for example, the terminal device 1 may execute the second application).

The above-described operations of the base station device 3 and the terminal device 1 makes it possible to execute the plurality of applications authorized with different ranges (different range classes) in parallel. Here, the transmission resource pool specified with the sixteenth parameter (Connected-TxResourcePool) may be specified for each of the plurality of authorized ranges. The transmission resource pool specified with the third parameter (Idle-TxResourcePool) may be specified for each of the plurality of authorized ranges. The reception resource pool specified with the fourth parameter (RxResourcePool) may be specified for each of the plurality of authorized ranges.

The assistance information may include information for requesting authorization (information on the request for authorization). For example, the assistance information may include information for requesting authorization with any of the ranges (i.e., high, medium, and/or low).

For example, the terminal device 1 may transmit information for requesting authorization with one or a plurality of the ranges, as assistance information. For example, the terminal device 1 may transmit information for requesting authorization for execution with the range: high and information for requesting authorization for execution with the range: low.

The assistance information may include information indicating that the operation for public safety (PS) has been authorized. The assistance information may include information indicating that the operation for commercial use has been authorized.

The assistance information may include information associated with D2D, information associated with D2D discovery, and/or information associated with D2D communication.

The other example of the method of configuring (indicating, specifying, determining, or providing) the authorized ranges will be described below.

Here, the following other example of the method of configuring the authorized ranges may be applied only to D2D discovery or D2D communication. The following other example of the method of configuring the authorized ranges may be applied to D2D discovery and D2D communication individually.

For example, the terminal device 1 having D2D capability may set $P_{CMAX,\ c}$ in accordance with Math (4) when the terminal device 1 is configured to execute D2D transmission by a higher layer (for example, by the RRC layer).

[Math. 4]

$$P_{CMAX\_L,c} \leq P_{CMAX,c} \leq P_{CMAX\_H,c} \text{ with}$$

$$P_{CMAX\_L,c} = \text{MIN}\{P_{EMAX,c} - \Delta T_{C,c}, P_{PowerClass} - \text{MAX}(MPRc - A - MPRc + \Delta T_{IB,c} + \Delta T_{C,c}, P - MPRc)\}$$

$$P_{CMAX\_H,c} = \text{MIN}\{P_{EMAX,c}, P_{PowerClass}, P_{AuthorizedRange}\} \quad (4)$$

Here, $P_{AuthorizedRange}$ denotes the value of the maximum output power (also referred to as the maximum transmit power) given so as to correspond to the authorized range. For example, when execution with the range: high has been authorized, the terminal device 1 may set the value of the maximum output power corresponding to the range: high as $P_{AuthorizedRange}$. When execution with the range: medium has been authorized, the terminal device 1 may set the value of the maximum output power corresponding to the range: medium as $P_{AuthorizedRange}$. When execution with the range: low has been authorized, the terminal device 1 may set the value of the maximum output power corresponding to the range: low as $P_{AuthorizedRange}$.

In other words, $P_{AuthorizedRange}$ may be the value of the maximum output power given so as to correspond to the authorized range for D2D transmission. Specifically, the terminal device 1 may determine the parameter: $P_{CMAX,\ c}$ in accordance with the smallest power value among the value of the parameter: $P_{EMAX,\ c}$, the value of the parameter: $P_{PowerClass}$, and the value of the parameter: $P_{AuthorizedRange}$. Here, the value of the $P_{AuthorizedRange}$ may be defined for each operator (PLMN). The value of the $P_{AuthorizedRange}$ may be defined for each cell. The value of the $P_{AuthorizedRange}$ may be defined for each terminal device 1. The value of the $P_{AuthorizedRange}$ may be defined for each application.

As the value of the maximum output power to be set as $P_{AuthorizedRange}$, $P_{AuthorizedRange\_PS\ (Public\ Safety)}$ and/or $P_{AuthorizedRange\_CU\ (Commercial\ Use)}$ may be defined. In other words, a maximum output power in a case where the terminal device 1 has been authorized to operate for public safety (PS) may be defined. A maximum output power in a case where the terminal device 1 has been authorized to operate for commercial use may be defined.

Specifically, when having been authorized to operate for public safety (PS), the terminal device 1 may set the value of the corresponding maximum output power as $P_{AuthorizedRange}$. When having been authorized to operate for commercial use, the terminal device 1 may set the value of the corresponding maximum output power as $P_{AuthorizedRange}$. In other words, the terminal device 1 may switch the values of the maximum transmit power to be set as $P_{AuthorizedRange}$, in accordance with whether the D2D transmission is associated with public safety (PS) or is associated with commercial use.

Here, the value of the maximum output power to be set as $P_{AuthorizedRange}$ may be preconfigured. The value of the maximum output power to be set as $P_{AuthorizedRange}$ may be configured using a higher layer signal. For example, the value of the maximum output power to be set as $P_{AuthorizedRange}$ may be configured using an RRC message (dedicated message). For example, the value of the maximum output power to be set as $P_{AuthorizedRange}$ may be configured in a cell-specific and/or UE-specific manner.

The value of the maximum output power to be set as $P_{AuthorizedRange}$ may be configured in a manner that depends on the application to be executed. The value of the maximum output power to be set as $P_{AuthorizedRange}$ may be preconfigured in a specification or the like.

The value of the maximum output power to be set as $P_{AuthorizedRange}$ may be stored in a subscriber identity module (SIM). Here, the SIM is also referred to as a universal subscriber identity module (USIM). A universal integrated circuit card (UICC) may include a SIM application or a USIM application. Here, the UICC may be referred to as a SIM card or a USIM card. In other words, the value of the maximum output power to be set as $P_{AuthorizedRange}$ may be stored in the UICC.

The value of the maximum output power to be set as $P_{AuthorizedRange}$ may be stored in the terminal device 1. Here, the value of the maximum output power stored in the SIM may have a higher priority than that of the value of the maximum output power stored in the terminal device 1. Specifically, when the value of the maximum output power stored in the SIM and the value of the maximum output power stored in the terminal device 1 are different from each other, the terminal device 1 may set the value of the maximum output power stored in the SIM as $P_{AuthorizedRange}$.

The authorized range (authorized range class) corresponding to the value of the maximum output power to be set as $P_{AuthorizedRange}$ may be preconfigured. For example, the terminal device 1 may switch the values of the maximum output power to be set as $P_{AuthorizedRange}$ with reference to the preconfigured authorized range. Here, the authorized range may be configured using a higher layer signal. For example, the authorized range may be configured using an RRC message (dedicated message). For example, the authorized range may be configured in a cell-specific and/or UE-specific manner.

The authorized range may be configured in a manner that depends on the application to be executed. The authorized range may be pre-defined in a specification or the like.

The authorized range may be stored in the SIM. The authorized range may be stored in the terminal device 1.

Here, the authorized range stored in the SIM may have a higher priority than that of the authorized range stored in the terminal device 1. Specifically, when the authorized range stored in the SIM and the authorized range stored in the terminal device 1 are different from each other, the terminal device 1 may set an authorized range as $P_{AuthorizedRange}$ with reference to the authorized range stored in the SIM. Alternatively, when the authorized range stored in the SIM and the authorized range stored in the terminal device 1 are different from each other, all the authorized ranges in the SIM and the terminal device 1 may be regarded as being authorized.

Here, as described above, the authorized range may be applied to D2D discovery. Specifically, the authorized range may be applied to the transmission of D2D data corresponding to D2D discovery. In other words, the authorized range may be applied to the transmission on the PSDCH. Specifically, the terminal device 1 may apply Math (4) to the transmission on the PSDCH.

For example, the authorized range may be applied to D2D communication. The authorized range may be applied to the transmission of D2D data corresponding to D2D communication. In other words, the authorized range may be applied to the transmission on the PSSCH. Specifically, the terminal device 1 may apply Math (4) to the transmission on the PSSCH.

The authorized range may be applied to the transmission of the PSBCH/SSS. Specifically, the terminal device 1 may apply Math (4) to the transmission of the PSBCH/SSS. Here, the authorized range does not need to be applied to the transmission of the PSBCH/SSS. For example, the configured maximum transmit power may be applied to the transmission of the PSBCH/SSS with no authorized range applied. In other words, the authorized range does not need to be defined for the transmission of the PSBCH/SSS. Specifically, the terminal device 1 may apply Math (3) to the transmission of the PSBCH/SSS without the application of Math (4).

A configuration of a device according to the present embodiment will be described below.

Figure 9:
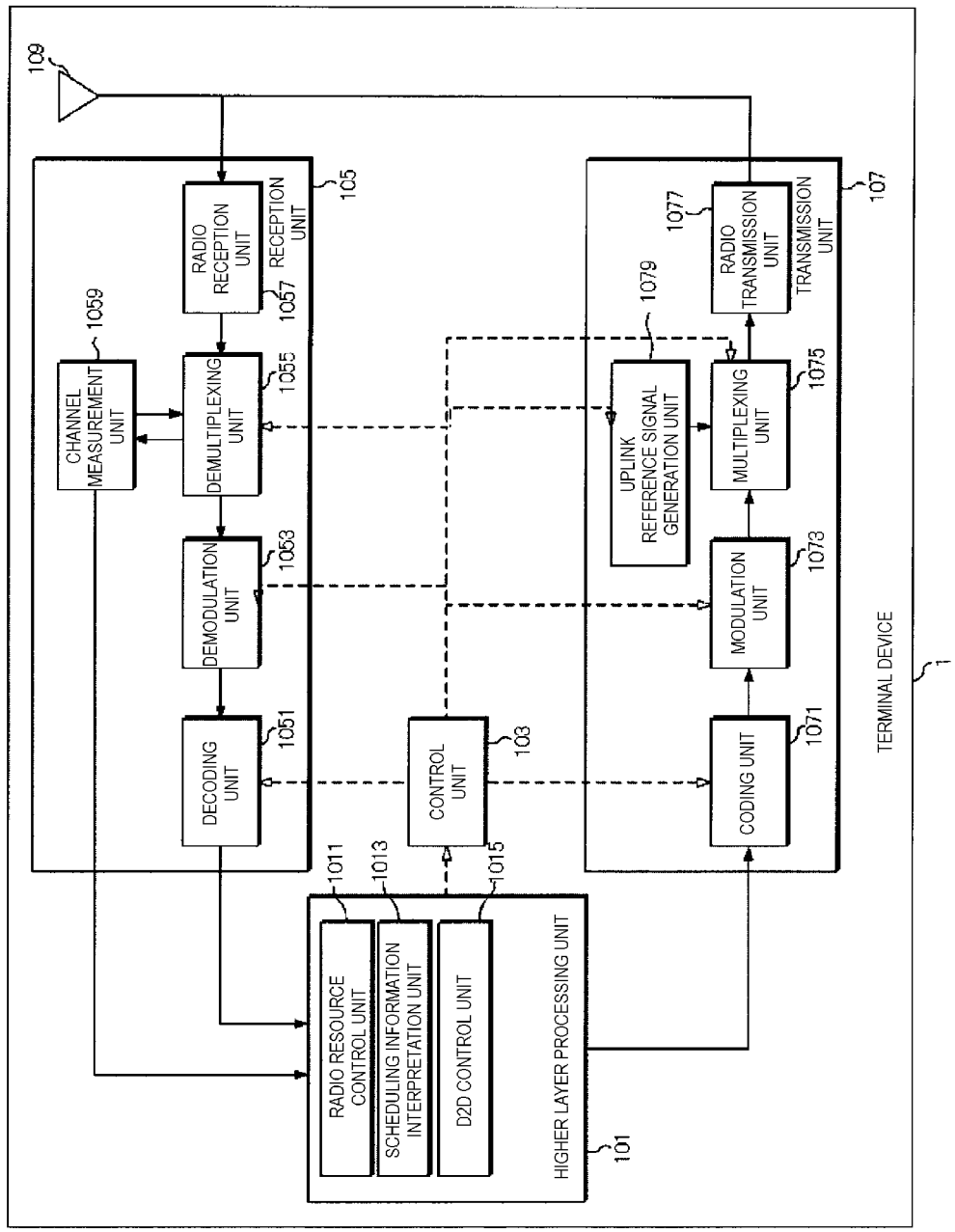
FIG. 9 is a schematic block diagram illustrating a configuration of the terminal device 1 according to the present embodiment.

FIG. 9 is a schematic block diagram illustrating a configuration of the terminal device 1 according to the present embodiment. As is illustrated, the terminal device 1 is configured to include a higher layer processing unit 101, a control unit 103, a reception unit 105, a transmission unit 107, and a transmit and receive antenna unit 109. The higher layer processing unit 101 is configured to include a radio resource control unit 1011, a scheduling information interpretation unit 1013, and a D2D control unit 1015. The reception unit 105 is configured to include a decoding unit 1051, a demodulation unit 1053, a demultiplexing unit 1055, a radio reception unit 1057, and a channel measurement unit 1059. Furthermore, the transmission unit 107 is configured to include a coding unit 1071, a modulation unit 1073, a multiplexing unit 1075, a radio transmission unit 1077, and an uplink reference signal generation unit 1079.

The higher layer processing unit 101 outputs uplink data (transport block) generated by a user operation or the like, to the transmission unit 107. The higher layer processing unit 101 performs processing of the medium access control (MAC) layer, the packet data convergence protocol (PDCP) layer, the radio link control (RLC) layer, and the radio resource control (RRC) layer.

The radio resource control unit 1011 included in the higher layer processing unit 101 manages various pieces of configuration information/parameters of the terminal device 1 itself. The radio resource control unit 1011 sets the various pieces of configuration information/parameters on the basis of a higher layer signal received from the base station device 3. Specifically, the radio resource control unit 1011 sets the various pieces of configuration information/parameters on the basis of the information indicating the various pieces of configuration information/parameters received from the base station device 3. Furthermore, the radio resource control unit 1011 generates information to be mapped to each channel in uplink/sidelink, and outputs the generated information to the transmission unit 107.

The scheduling information interpretation unit 1013 included in the higher layer processing unit 101 interprets the DCI format/D2D grant (scheduling information) received through the reception unit 105, generates control information for controlling of the reception unit 105 and the transmission unit 107, on the basis of a result of interpreting the DCI format/D2D grant, and outputs the generated control information to the control unit 103.

The D2D control unit 1015 included in the higher layer processing unit 101 controls D2D, D2D discovery, D2D communication, and/or ProSe-assisted WLAN direct communication in accordance with the various pieces of configuration information/parameters managed by the radio resource control unit 1011.

On the basis of the control information originating from the higher layer processing unit 101, the control unit 103 generates a control signal for controlling the reception unit 105 and the transmission unit 107. The control unit 103 outputs the generated control signal to the reception unit 105 and the transmission unit 107 to control the reception unit 105 and the transmission unit 107.

In accordance with the control signal input from the control unit 103, the reception unit 105 demultiplexes, demodulates, and decodes a reception signal received from the base station device 3 through the transmit and receive antenna unit 109, and outputs the resulting information to the higher layer processing unit 101.

The radio reception unit 1057 converts (down-converts) a downlink signal received through the transmit and receive antenna unit 109 into a baseband signal by orthogonal demodulation, removes unnecessary frequency components, controls an amplification level in such a manner as to suitably maintain a signal level, performs orthogonal demodulation on the basis of an in-phase component and an orthogonal component of the received signal, and converts the resulting orthogonally-demodulated analog signal into a digital signal. The radio reception unit 1057 removes a portion corresponding to a cyclic prefix (CP) from the digital signal resulting from the conversion, performs fast Fourier transform (FFT) on the signal from which the CP has been removed, and extracts a signal in the frequency domain.

The demultiplexing unit 1055 demultiplexes the extracted signal into the PHICH, the PDCCH, the EPDCCH, the PDSCH, and the downlink reference signal. Furthermore, the demultiplexing unit 1055 makes a compensation of channels including the PHICH, the PDCCH, the EPDCCH, and the PDSCH, from a channel estimate input from the channel measurement unit 1059. Furthermore, the demultiplexing unit 1055 outputs the downlink reference signal resulting from the demultiplexing, to the channel measurement unit 1059.

The demodulation unit 1053 multiplies the PHICH by a corresponding code for composition, demodulates the resulting composite signal in compliance with a binary phase shift keying (BPSK) modulation scheme, and outputs a result of the demodulation to the decoding unit 1051. The decoding unit 1051 decodes the PHICH destined for the terminal device 1 itself and outputs the HARQ indicator resulting from the decoding to the higher layer processing unit 101. The demodulation unit 1053 demodulates the PDCCH and/or the EPDCCH in compliance with a QPSK modulation scheme and outputs a result of the demodulation to the decoding unit 1051. The decoding unit 1051 attempts to decode the PDCCH and/or the EPDCCH. In a case of succeeding in the decoding, the decoding unit 1051 outputs downlink control information resulting from the decoding and an RNTI to which the downlink control information corresponds, to the higher layer processing unit 101.

The demodulation unit 1053 demodulates the PDSCH in compliance with a modulation scheme notified with the downlink grant, such as quadrature phase shift keying (QPSK), 16 quadrature amplitude modulation (QAM), or 64 QAM, and outputs a result of the demodulation to the decoding unit 1051. The decoding unit 1051 decodes the data on the basis of information on a coding rate notified with the downlink control information, and outputs, to the higher layer processing unit 101, the downlink data (the transport block) resulting from the decoding.

The channel measurement unit 1059 measures a downlink path loss or a channel state from the downlink reference signal input from the demultiplexing unit 1055, and outputs the measured path loss or channel state to the higher layer processing unit 101. Furthermore, the channel measurement unit 1059 calculates a downlink channel estimate from the downlink reference signal and outputs the calculated downlink channel estimate to the demultiplexing unit 1055. The channel measurement unit 1059 performs channel measurement and/or interference measurement in order to calculate the CQI.

The transmission unit 107 generates the uplink reference signal in accordance with the control signal input from the control unit 103, codes and modulates the uplink data (transport block) input from the higher layer processing unit 101, multiplexes the PUCCH, the PUSCH, and the generated uplink reference signal, and transmits a result of the multiplexing to the base station device 3 through the transmit and receive antenna unit 109.

The coding unit 1071 codes the uplink control information input from the higher layer processing unit 101 in compliance with a coding scheme, such as convolutional coding or block coding. Furthermore, the coding unit 1071 performs turbo coding on the basis of information used for the scheduling of the PUSCH.

The modulation unit 1073 modulates coded bits input from the coding unit 1071, in compliance with the modulation scheme notified with the downlink control information, such as BPSK, QPSK, 16 QAM, or 64 QAM, or in compliance with a modulation scheme prescribed in advance for each channel. On the basis of the information used for the scheduling of the PUSCH, the modulation unit 1073 determines the number of data sequences to be spatial-multiplexed, maps a plurality of pieces of uplink data to be transmitted on the same PUSCH to a plurality of sequences through multiple input multiple output spatial multiplexing (MIMO SM), and performs precoding on the sequences.

The uplink reference signal generation unit 1079 generates a sequence acquired according to a rule (formula) prescribed in advance, on the basis of a physical layer cell identity (also referred to as a PCI, a cell ID, or the like) for identifying the base station device 3, a bandwidth to which the uplink reference signal is mapped, a cyclic shift notified with the uplink grant, a parameter value for generation of a DMRS sequence, and the like. In accordance with the control signal input from the control unit 103, the multiplexing unit 1075 rearranges modulation symbols of the PUSCH in parallel and then performs discrete Fourier transform (DFT) on the rearranged modulation symbols. Furthermore, the multiplexing unit 1075 multiplexes PUCCH and PUSCH signals and the generated uplink reference signal for each transmit antenna port. To be more precise, the multiplexing unit 1075 maps the PUCCH and PUSCH signals and the generated uplink reference signal to the resource elements for each transmit antenna port.

The radio transmission unit 1077 performs inverse fast Fourier transform (IFFT) on a signal resulting from the multiplexing, generates an SC-FDMA symbol, attaches the CP to the generated SC-FDMA symbol, generates a baseband digital signal, converts the baseband digital signal into an analog signal, removes unnecessary frequency components using a low-pass filter, up-converts the signal into a signal of a carrier frequency, performs power amplification, and outputs a final result to the transmit and receive antenna unit 109 for transmission.

Figure 10:
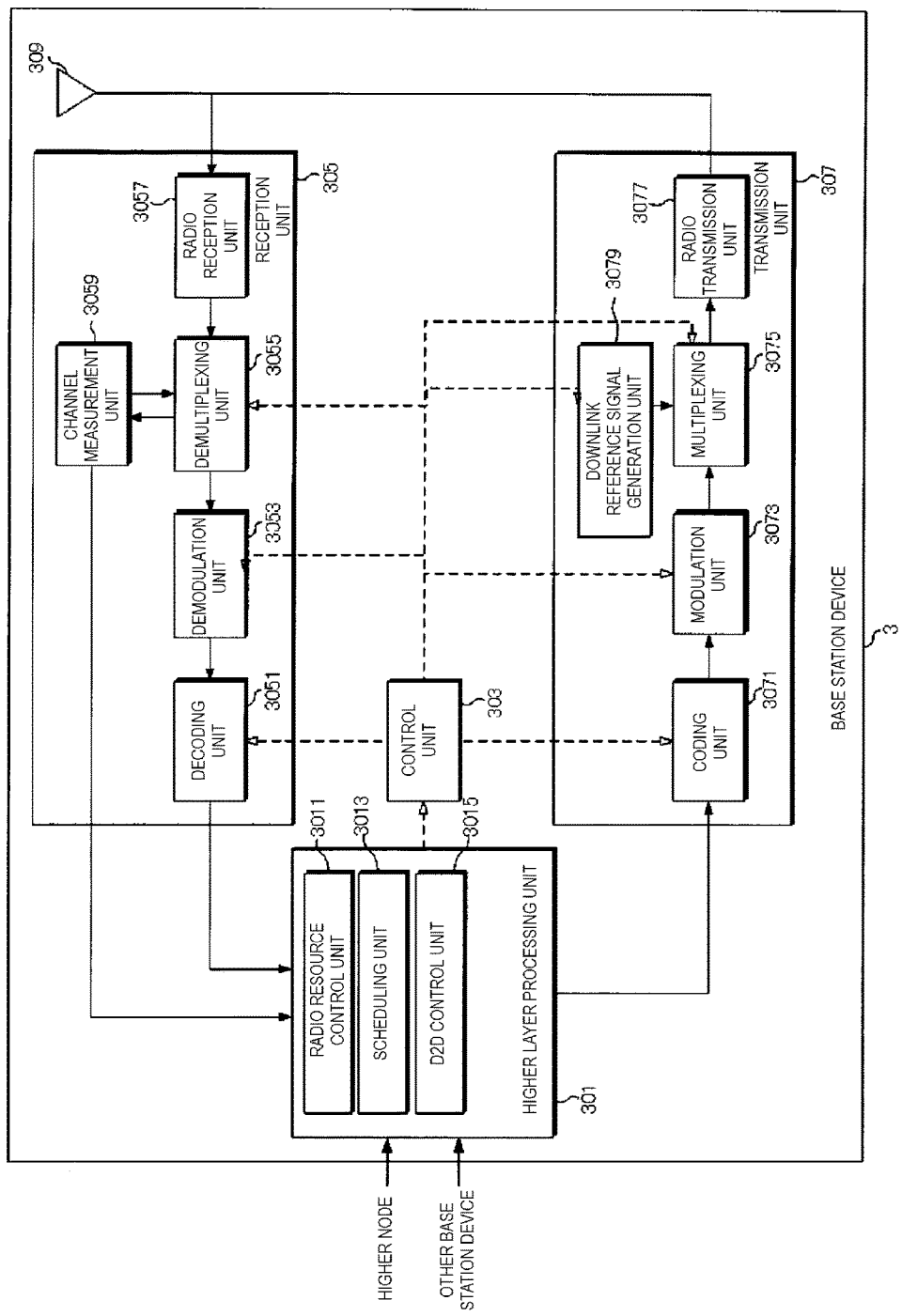
FIG. 10 is a schematic block diagram illustrating a configuration of a base station device 3 according to the present embodiment.

FIG. 10 is a schematic block diagram illustrating a configuration of the base station device 3 according to the present embodiment. As is illustrated, the base station device 3 is configured to include a higher layer processing unit 301, a control unit 303, a reception unit 305, a transmission unit 307, and a transmit and receive antenna unit 309. The higher layer processing unit 301 is configured to include a radio resource control unit 3011, a scheduling unit 3013, and a D2D control unit 3015. The reception unit 305 is configured to include a decoding unit 3051, a demodulation unit 3053, a demultiplexing unit 3055, a radio reception unit 3057, and a channel measurement unit 3059. Furthermore, the transmission unit 307 is configured to include a coding unit 3071, a modulation unit 3073, a multiplexing unit 3075, a radio transmission unit 3077, and a downlink reference signal generation unit 3079.

The higher layer processing unit 301 performs processing of the medium access control (MAC) layer, the packet data convergence protocol (PDCP) layer, the radio link control (RLC) layer, and the radio resource control (RRC) layer. Furthermore, the higher layer processing unit 301 generates control information for controlling the reception unit 305 and the transmission unit 307, and outputs the generated control information to the control unit 303.

The radio resource control unit 3011 included in the higher layer processing unit 301 generates, or acquires from a higher node, the downlink data (transport block) mapped to the downlink PDSCH, system information, the RRC message, the MAC control element (CE), and the like, and outputs a result of the generation or the acquirement to the transmission unit 307. Furthermore, the radio resource control unit 3011 manages various pieces of configuration information/parameters for each of the terminal devices 1. The radio resource control unit 1011 may set various pieces of configuration information/parameters for each of the terminal devices 1 via a higher layer signal. Specifically, the radio resource control unit 1011 transmits/broadcasts information indicating the various pieces of configuration information/parameters.

The scheduling unit 3013 included in the higher layer processing unit 301 determines a frequency and a subframe to which the physical channels (the PDSCH and the PUSCH) are allocated, the coding rate and modulation scheme for the physical channels (the PDSCH and the PUSCH), the transmit power, and the like, from the received channel state information and from the channel estimate, channel quality, or the like input from the channel measurement unit 3059. The scheduling unit 3013 generates the control information (for example, the DCI format) in order to control the reception unit 305 and the transmission unit 307 on the basis of a result of the scheduling, and outputs the generated information to the control unit 303. Furthermore, the scheduling unit 3013 determines timing at which the transmission process and reception process are performed.

The D2D control unit 3015 included in the higher layer processing unit 301 controls D2D, D2D discovery, D2D communication, and/or ProSe-assisted WLAN direct communication in the terminal device 1 performing communication using a cellular link, in accordance with the various pieces of configuration information/parameters managed by the radio resource control unit 3011. The D2D control unit 3015 may generate information associated with D2D to be transmitted to another base station device 3 or terminal device 1.

On the basis of the control information originating from the higher layer processing unit 301, the control unit 303 generates a control signal for controlling the reception unit 305 and the transmission unit 307. The control unit 303 outputs the generated control signal to the reception unit 305 and the transmission unit 307 to control the reception unit 305 and the transmission unit 307.

In accordance with the control signal input from the control unit 303, the reception unit 305 demultiplexes, demodulates, and decodes the reception signal received from the terminal device 1 through the transmit and receive antenna unit 309, and outputs information resulting from the decoding to the higher layer processing unit 301. The radio reception unit 3057 converts (down-converts) an uplink signal received through the transmit and receive antenna unit 309 into a baseband signal by orthogonal demodulation, removes unnecessary frequency components, controls the amplification level in such a manner as to suitably maintain a signal level, performs orthogonal demodulation on the basis of an in-phase component and an orthogonal component of the received signal, and converts the resulting orthogonally-demodulated analog signal into a digital signal.

The radio reception unit 3057 removes a portion corresponding to a cyclic prefix (CP) from the digital signal resulting from the conversion. The radio reception unit 3057 performs fast Fourier transform (FFT) on the signal from which the CP has been removed, extracts a signal in the frequency domain, and outputs the resulting signal to the demultiplexing unit 3055.

The demultiplexing unit 1055 demultiplexes the signal input from the radio reception unit 3057 into the PUCCH, the PUSCH, and the signal such as the uplink reference signal. Moreover, the demultiplexing is performed on the basis of radio resource allocation information that is determined in advance by the base station device 3 using the radio resource control unit 3011 and that is included in the uplink grant notified to each of the terminal devices 1. Furthermore, the demultiplexing unit 3055 makes a compensation of channels including the PUCCH and the PUSCH from the channel estimate input from the channel measurement unit 3059. Furthermore, the demultiplexing unit 3055 outputs an uplink reference signal resulting from the demultiplexing, to the channel measurement unit 3059.

The demodulation unit 3053 performs inverse discrete Fourier transform (IDFT) on the PUSCH, acquires the modulation symbol, and performs reception signal demodulation on each of the modulation symbols of the PUCCH and the PUSCH, in compliance with the modulation scheme prescribed in advance, such as binary phase shift keying (BPSK), QPSK, 16 QAM, or 64 QAM, or in compliance with the modulation scheme that the base station device 3 itself notifies in advance with the uplink grant to each of the terminal devices 1. The demodulation unit 3053 demultiplexes the modulation symbols of the plurality of pieces of uplink data transmitted on the same PUSCH by using the MIMO SM, on the basis of the number of spatial-multiplexed sequences notified in advance with the uplink grant to each of the terminal devices 1 and information indicating the precoding to be performed on the sequences.

The decoding unit 3051 decodes the coded bits of the PUCCH and the PUSCH, which have been demodulated, at the coding rate in compliance with a coding scheme prescribed in advance, the coding rate being prescribed in advance or being notified in advance with the uplink grant to the terminal device 1 by the base station device 3 itself, and outputs, to the higher layer processing unit 101, the decoded uplink data and uplink control information. In a case where the PUSCH is re-transmitted, the decoding unit 3051 performs the decoding using the coded bits input from the higher layer processing unit 301 and retained in an HARQ buffer, and the demodulated coded bits. The channel measurement unit 309 measures the channel estimate, the channel quality, and the like, on the basis of the uplink reference signal input from the demultiplexing unit 3055, and outputs a result of the measurement to the demultiplexing unit 3055 and the higher layer processing unit 301.

The transmission unit 307 generates the downlink reference signal in accordance with the control signal input from the control unit 303, codes and modulates the HARQ indicator, the downlink control information, and the downlink data that are input from the higher layer processing unit 301, multiplexes the PHICH, the PDCCH, the EPDCCH, the PDSCH, and the downlink reference signal, and transmits a result of the multiplexing to the terminal device 1 through the transmit and receive antenna unit 309.

The coding unit 3071 codes the HARQ indicator, the downlink control information, and the downlink data that are input from the higher layer processing unit 301, in compliance with the coding scheme prescribed in advance, such as block coding, convolutional coding, or turbo coding, or in compliance with the coding scheme determined by the radio resource control unit 3011. The modulation unit 3073 modulates the coded bits input from the coding unit 3071, in compliance with the modulation scheme prescribed in advance, such as BPS K, QPSK, 16 QAM, or 64 QAM, or in compliance with the modulation scheme determined by the radio resource control unit 3011.

The downlink reference signal generation unit 3079 generates, as the downlink reference signal, a sequence that is already known to the terminal device 1 and that is acquired according to a rule prescribed in advance on the basis of the physical layer cell identity (PCI) for identifying the base station device 3, and the like. The multiplexing unit 3075 multiplexes the modulated modulation symbol of each channel and the generated downlink reference signal. To be more precise, the multiplexing unit 3075 maps the modulated modulation symbol of each channel and the generated downlink reference signal to the resource elements.

The radio transmission unit 3077 performs inverse fast Fourier transform (IFFT) on the modulation symbol resulting from the multiplexing or the like, generates an OFDM symbol, attaches a CP to the generated OFDM symbol, generates a baseband digital signal, converts the baseband digital signal into an analog signal, removes unnecessary frequency components using a low-pass filter, up-converts the signal into a signal of a carrier frequency, performs power amplification, and outputs a final result to the transmit and receive antenna unit 309 for transmission.

In other words, the terminal device 1 according to the present embodiment is a terminal device 1 configured to perform D2D transmission by a higher layer. The terminal device 1 includes: the reception unit 105 receiving, from the base station device, one or a plurality of first parameters relating to transmit power and receiving, from the base station device, the second parameter for configuring a first transmission resource; and the transmission unit 107 performing, upon receipt of the second parameter in the RRC idle state, the D2D transmission using the first transmission resource with the transmit power in accordance with a first parameter corresponding to an authorized range among the one or plurality of first parameters.

The terminal device 1 according to the present embodiment includes the control unit 103 performing an RRC connection establishment procedure upon no receipt of the second parameter in the RRC idle state.

The reception unit 105 receives, from the base station device, one or a plurality of third parameters relating to transmit power and receives, from the base station device, a fourth parameter for configuring a second transmission resource, and the transmission unit 107 performs, upon receipt of the fourth parameter in the RRC-connected state, the D2D transmission using the second transmission resource with the transmit power in accordance with a third parameter corresponding to the authorized range among the one or plurality of third parameters.

The reception unit 105 receives, from the base station device, a single third parameter relating to transmit power and receives, from the base station device, the fourth parameter for configuring the second transmission resource, and the transmission unit 107 performs, upon reception of the fourth parameter in the RRC-connected state, the D2D transmission using the second transmission resource with the transmit power in accordance with the third parameter irrespective of authorized range.

The terminal device 1 according to the present embodiment includes the control unit 103 requesting, upon no reception of the fourth parameter in the RRC-connected state, resource allocation for the D2D transmission.

The terminal device 1 according to the present embodiment is a terminal device configured to perform D2D transmission by a higher layer. The terminal device 1 includes the control unit 103 determining maximum transmit power for D2D transmission in a certain cell on the basis of the smallest transmit power value among a transmit power value ($P_{EMAX, c}$) for the certain cell given in accordance with a parameter (P-Max) configured using an RRC message, a transmit power value ($P_{PowerClass}$) given in accordance with a power class of the terminal device, and a transmit power value given so as to correspond to the authorized range.

The base station device 3 according to the present embodiment is a base station device communicating with a terminal device configured to perform D2D transmission by a higher layer. The base station device 3 includes the transmission unit 307 transmitting one or a plurality of first parameters relating to transmit power to the terminal device, and transmitting a second parameter for configuring a first transmission resource to the terminal device, and the terminal device in the RRC idle state performs, upon transmission of the second parameter, the D2D transmission using the first transmission resource with the transmit power in accordance with a first parameter corresponding to an authorized range among the one or plurality of the first parameters.

Upon no transmission of the second parameter, the terminal device in the RRC idle state executes an RRC connection establishment procedure.

The transmission unit 307 transmits one or a plurality of third parameters relating to transmit power to the terminal device and transmits a fourth parameter for configuring a second transmission resource to the terminal device, and the terminal device in the RRC-connected state performs, upon transmission of the fourth parameter, the D2D transmission using the second transmission resource with the transmit power in accordance with a third parameter corresponding to the authorized range among the one or plurality of third parameters.

The transmission unit 307 transmits a single third parameter relating to transmit power to the terminal device and transmits the fourth parameter for configuring the second transmission resource to the terminal device, and the terminal device in the RRC-connected state performs, upon transmission of the fourth parameter, the D2D transmission using the second transmission resource with the transmit power in accordance with the third parameter irrespective of authorized range.

Upon no transmission of the fourth parameter, the terminal device in the RRC-connected state requests resource allocation for the D2D transmission.

The base station device 3 according to the present embodiment is a base station device communicating with a terminal device configured to perform D2D transmission by a higher layer. The base station device 3 includes the control unit 303 determining maximum transmit power for D2D transmission in a certain cell on the basis of the smallest transmit power value among a transmit power value ($P_{EMAX, c}$) for the certain cell given in accordance with a parameter (P-Max) configured using an RRC message, a transmit power value ($P_{PowerClass}$) given in accordance with the power class of the terminal device, and a transmit power value given so as to correspond to the authorized range.

Here, as described above, the transmit power of the PSSS associated with the PSBCH may be the same as the transmit power of the PSBCH. The transmit power of the SSSS associated with the PSBCH may be the same as the transmit power of the PSBCH. The transmit power of the SSSS associated with the PSBCH may be lower than the transmit power of the PSBCH and/or the transmit power of the PSSS by a prescribed value.

Further, the PSBCH, the PSSS, and/or the SSSS may be transmitted using the same antenna port. Specifically, the same antenna port as the antenna port for the PSBCH may be used for the PSSS. The same antenna port as the antenna port for the PSSS may be used for the SSSS. In other words, the same antenna port as the antenna port for the PSBCH may be used for the SSSS.

Here, different antenna port numbers may be defined on the basis of the number of antenna ports configured for the PUSCH. Specifically, the antenna ports to be used for the transmission of a physical channel (or physical signal) may depend on the number of the antenna ports configured for the physical channel (or physical signal). For example, the antenna port number may be defined as 10 when the number of antenna ports configured for the PUSCH is one. The antenna port numbers may be defined as 20 and 21 when the number of antenna ports configured for the PUSCH is two. The antenna port numbers may be defined as 40, 41, 42, and 43 when the number of antenna ports configured for the PUSCH is four.

Here, the antenna port number of the antenna port to be used for the transmission of the PSBCH, the PSSS, and/or the SSSS may be 10. In other words, the antenna port to be used for the transmission of the PSBCH, the PSSS, and/or the SSSS is the same as the antenna port to be used for the transmission of the PUSCH (i.e., the antenna port having the antenna port number 10) when the number of antenna ports configured for the PUSCH is one.

Further, the PSBCH, the PSSS, and/or the SSSS may be transmitted using the same antenna port.

The PSBCH, the PSSS, and/or the SSSS may be transmitted using the same bandwidth, the same subcarrier, and/or the same resource block. Specifically, the same bandwidth, the same subcarrier, and/or the same resource block as the bandwidth, the subcarrier, and/or the resource block for the PSBCH may be used for the PSSS. The same bandwidth, the same subcarrier, and/or the same resource block as the bandwidth, the subcarrier, and/or the resource block for the PSSS may be used for the SSSS. In other words, the same bandwidth, the same subcarrier, and/or the same resource block as the bandwidth, the subcarrier, and/or the resource block for the PSBCH may be used for the SSSS.

With this configuration, D2D can be performed efficiently.

A program running on each of the base station device 3 and the terminal device 1 according to the present invention may be a program that controls a central processing unit (CPU) and the like (a program for causing a computer to operate) in such a manner as to realize the functions according to the above-described embodiment of the present invention. In this case, the information handled in these devices is temporarily stored in a random access memory (RAM) while being processed. Thereafter, the information is stored in various types of read only memory (ROM) such as a flash ROM or a hard disk drive (HDD) and when necessary, is read by the CPU to be modified or rewritten.

Moreover, the terminal device 1 and the base station device 3 according to the above-described embodiment may be partially realized by the computer. This configuration may be realized by recording a program for realizing such control functions on a computer-readable recording medium and causing a computer system to read the program recorded on the recording medium for execution.

Moreover, the "computer system" here is defined as a computer system built into the terminal device 1 or the base station device 3, and the computer system includes an OS and hardware components such as a peripheral device. Furthermore, the "computer-readable recording medium" refers to a portable medium such as a flexible disk, a magneto-optical disk, a ROM, and a CD-ROM, and a storage device such as a hard disk built into the computer system.

Moreover, the "computer-readable recording medium" may include a medium that dynamically retains the program for a short period of time, such as a communication line that is used to transmit the program over a network such as the Internet or over a communication circuit such as a telephone circuit, and a medium that retains, in that case, the program for a fixed period of time, such as a volatile memory within the computer system which functions as a server or a client. Furthermore, the program may be configured to realize some of the functions described above, and additionally may be configured to be capable of realizing the functions described above in combination with a program already recorded in the computer system.

Furthermore, the base station device 3 according to the above-described embodiment can be realized as an aggregation (a device group) constituted of a plurality of devices. Devices constituting the device group may be each equipped with some or all portions of each function or each functional block of the base station device 3 according to the above-described embodiment. It is only required that the device group itself include general functions or general functional blocks of the base station device 3. Furthermore, the terminal device 1 according to the above-described embodiment can also communicate with the base station device as the aggregation.

Furthermore, the base station device 3 according to the above-described embodiment may be an evolved universal terrestrial radio access network (EUTRAN). Furthermore, the base station device 3 according to the above-described embodiment may have some or all portions of a function of a node higher than an eNodeB.

Furthermore, some or all portions of each of the terminal device 1 and the base station device 3 according to the above-described embodiment may be realized as an LSI that is a typical integrated circuit or may be realized as a chip set. The functional blocks of each of the terminal device 1 and the base station device 3 may be individually realized as a chip, or some or all of the functional blocks may be integrated into a chip. Furthermore, a circuit integration technique is not limited to the LSI, and the integrated circuit for the functional block may be realized with a dedicated circuit or a general-purpose processor. Furthermore, if with advances in semiconductor technology, a circuit integration technology with which an LSI is replaced appears, it is also possible to use an integrated circuit based on the technology.

Furthermore, according to the above-described embodiment, the terminal device is described as one example of a communication device, but the invention of the present application is not limited to this, and can be applied to a terminal device or a communication device, such as a fixed-type electronic apparatus installed indoors or outdoors, or a stationary-type electronic apparatus, for example, an AV apparatus, a kitchen apparatus, a cleaning or washing machine, an air-conditioning apparatus, office equipment, a vending machine, and other household apparatuses.

The embodiment of the present invention has been described in detail above referring to the drawings, but the specific configuration is not limited to the embodiment and includes, for example, a change in a design that falls within the scope that does not depart from the gist of the present invention. Furthermore, various modifications are possible within the scope of the present invention defined by claims, and embodiments that are made by suitably combining technical means disclosed according to the different embodiments are also included in the technical scope of the present invention. Furthermore, a configuration in which a constituent element that achieves the same effect is substituted for the one that is described according to the embodiment is also included in the technical scope of the present invention.

INDUSTRIAL APPLICABILITY

The present invention is applicable to a fixed-type or a stationary-type electronic apparatus installed indoors or outdoors, a household apparatus, and the like, in addition to a communication apparatus including a terminal device and a base station device.

REFERENCE SIGNS LIST 1 (1A, 1B, 1C) Terminal device
3 Base station device
101 Higher layer processing unit
103 Control unit
105 Reception unit 107 Transmission unit
109 Transmit and receive antenna unit
301 Higher layer processing unit
303 Control unit
305 Reception unit
307 Transmission unit
309 Transmit and receive antenna unit
1011 Radio resource control unit
1013 Scheduling information interpretation unit
1015 D2D control unit
3011 Radio resource control unit
3013 Scheduling unit
3015 D2D control unit

The invention claimed is:

1. A terminal device communicating with a network, the terminal device comprising:
   reception circuitry receiving a system information block from the network; and
   transmission circuitry transmitting a physical sidelink discovery channel associated with discovery using a link between the terminal device and a different terminal device, wherein
   the discovery is defined as a process that identifies the terminal device and the different terminal device being in proximity to each other,
   transmit power for the transmission of the physical sidelink discovery channel is given with reference to at least a maximum output power,
   an authorized range class is set on the terminal device, the authorized range class being one of short, medium, and long,
   the system information block includes a parameter corresponding to the short authorized range class, a parameter corresponding to the medium authorized range class, and a parameter corresponding to the long authorized range class, and
   the maximum output power is given with reference to one parameter corresponding to the authorized range class among the parameter corresponding to the short authorized range class, the parameter corresponding to the medium authorized range class, and the parameter corresponding to the long authorized range class included in the system information block.

2. The terminal device according to claim 1, wherein the authorized range class is defined for each public land mobile network (PLMN).

3. The terminal device according to claim 1, wherein the authorized range class is preconfigured in the terminal device.

4. The terminal device according to claim 1, wherein a subscriber identity module (SIM) or a storage medium in which the authorized range class is stored is referred to.

5. The terminal device according to claim 1, wherein:
   the authorized range class is preconfigured in the terminal device;
   a subscriber identity module (SIM) or a storage medium in which the authorized range class is stored is referred to; and
   the authorized range class stored in the subscriber identity module (SIM) or the storage medium is given a higher priority than a priority given to the authorized range class preconfigured in the terminal device.

6. The terminal device according to claim 1, wherein information on the authorized range class is transferred to the terminal device by a proximity based services (Prose) function.

7. The terminal device according to claim 1 being in-coverage of the network.

8. A network communicating with a terminal device, the network comprising transmission circuitry transmitting a system information block to the terminal device, wherein
   the terminal device transmits a physical sidelink discovery channel associated with discovery using a link between the terminal device and a different terminal device,
   the discovery is defined as a process that identifies the terminal device and the different terminal device being in proximity to each other,
   transmit power for the transmission of the physical sidelink discovery channel is given with reference to at least a maximum output power,
   an authorized range class is set on the terminal device, the authorized range class being one of short, medium, and long,
   the system information block includes a parameter corresponding to the short authorized range class, a parameter corresponding to the medium authorized range class, and a parameter corresponding to the long authorized range class, and
   the maximum output power is given with reference to one parameter corresponding to the authorized range class among the parameter corresponding to the short authorized range class, the parameter corresponding to the medium authorized range class, and the parameter corresponding to the long authorized range class included in the system information block.

9. A communication method of a terminal device communicating with a network, the communication method comprising the steps of:
   receiving a system information block from the network; and
   transmitting a physical sidelink discovery channel associated with discovery using a link between the terminal device and a different terminal device, wherein
   the discovery is defined as a process that identifies the terminal device and the different terminal device being in proximity to each other,
   transmit power for the transmission of the physical sidelink discovery channel is given with reference to at least a maximum output power,
   an authorized range class is set on the terminal device, the authorized range class being one of short, medium, and long,
   the system information block includes a parameter corresponding to the short authorized range class, a parameter corresponding to the medium authorized range class, and a parameter corresponding to the long authorized range class, and
   the maximum output power is given with reference to one parameter corresponding to the authorized range class among the parameter corresponding to the short authorized range class, the parameter corresponding to the medium authorized range class, and the parameter corresponding to the long authorized range class included in the system information block.

10. The communication method according to claim 9, wherein the authorized range class is defined for each public land mobile network (PLMN).

11. The communication method according to claim 9, wherein the authorized range class is preconfigured in the terminal device.

12. The communication method according to claim 9, wherein a subscriber identity module (SIM) or a storage medium in which the authorized range class is stored is referred to.

13. The communication method according to claim 9, wherein:
the authorized range class is preconfigured in the terminal device;
a subscriber identity module (SIM) or a storage medium in which the authorized range class is stored is referred to; and
the authorized range class stored in the subscriber identity module (SIM) or the storage medium is given a higher priority than a priority given to the authorized range class preconfigured in the terminal device.

14. The communication method according to claim 9, wherein information on the authorized range class is transferred to the terminal device by a proximity based services (Prose) function.

15. The communication method according to claim 9, wherein the terminal device is in-coverage of the network.

16. A communication method of a network communicating with a terminal device, the communication method comprising the step of transmitting a system information block to the terminal device, wherein
the terminal device transmits a physical sidelink discovery channel associated with discovery using a link between the terminal device and a different terminal device,
the discovery is defined as a process that identifies the terminal device and the different terminal device being in proximity to each other,
transmit power for the transmission of the physical sidelink discovery channel is given with reference to at least a maximum output power,
an authorized range class is set on the terminal device, the authorized range class being one of short, medium, and long,
the system information block includes a parameter corresponding to the short authorized range class, a parameter corresponding to the medium authorized range class, and a parameter corresponding to the long authorized range class, and
the maximum output power is given with reference to one parameter corresponding to the authorized range class among the parameter corresponding to the short authorized range class, the parameter corresponding to the medium authorized range class, and the parameter corresponding to the long authorized range class included in the system information block.

17. An integrated circuit mounted on a terminal device communicating with a network, the integrated circuit causing the terminal device to exert:
a function of receiving a system information block from the network; and
a function of transmitting a physical sidelink discovery channel associated with discovery using a link between the terminal device and a different terminal device, wherein
the discovery is defined as a process that identifies the terminal device and the different terminal device being in proximity to each other,
transmit power for the transmission of the physical sidelink discovery channel is given with reference to at least a maximum output power,
an authorized range class is set on the terminal device, the authorized range class being one of short, medium, and long,
the system information block includes a parameter corresponding to the short authorized range class, a parameter corresponding to the medium authorized range class, and a parameter corresponding to the long authorized range class, and
the maximum output power is given with reference to one parameter corresponding to the authorized range class among the parameter corresponding to the short authorized range class, the parameter corresponding to the medium authorized range class, and the parameter corresponding to the long authorized range class included in the system information block.

18. An integrated circuit mounted on a network communicating with a terminal device, the integrated circuit causing the network to exert a function of transmitting a system information block to the terminal device, wherein
the terminal device transmits a physical sidelink discovery channel associated with discovery using a link between the terminal device and a different terminal device,
the discovery is defined as a process that identifies the terminal device and the different terminal device being in proximity to each other,
transmit power for the transmission of the physical sidelink discovery channel is given with reference to at least a maximum output power,
an authorized range class is set on the terminal device, the authorized range class being one of short, medium, and long,
the system information block includes a parameter corresponding to the short authorized range class, a parameter corresponding to the medium authorized range class, and a parameter corresponding to the long authorized range class, and
the maximum output power is given with reference to one parameter corresponding to the authorized range class among the parameter corresponding to the short authorized range class, the parameter corresponding to the medium authorized range class, and the parameter corresponding to the long authorized range class included in the system information block.

* * * * *